US012679647B2

(12) United States Patent
Sadasivan et al.

(10) Patent No.: US 12,679,647 B2
(45) Date of Patent: Jul. 14, 2026

(54) AUTOMATED SHUTTLE ASSEMBLY AND METHODS OF USING THE SAME

(71) Applicant: INTELLIGRATED HEADQUARTERS, LLC, Mason, OH (US)

(72) Inventors: Saravanan Sadasivan, Charlotte, NC (US); Balaji Krishnaswamy, Charlotte, NC (US); Vinod Kumar Sakali, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 335 days.

(21) Appl. No.: 18/586,031

(22) Filed: Feb. 23, 2024

(65) Prior Publication Data

US 2024/0294334 A1     Sep. 5, 2024

(30) Foreign Application Priority Data

Mar. 1, 2023    (IN) .............................. 202311013766

(51) Int. Cl.
*B65G 1/04*          (2006.01)
(52) U.S. Cl.
CPC .................................. *B65G 1/0492* (2013.01)
(58) Field of Classification Search
CPC .................................................. B65G 1/0492
See application file for complete search history.

(56) References Cited

U.S. PATENT DOCUMENTS

| | | | |
|---|---|---|---|
| 10,556,744 B2 | 2/2020 | Winkler | |
| 2015/0310694 A1* | 10/2015 | Will | G07F 11/44 221/13 |
| 2018/0022547 A1* | 1/2018 | Wehner | B65G 1/065 414/279 |

(Continued)

FOREIGN PATENT DOCUMENTS

| | | |
|---|---|---|
| CN | 108328193 B | 8/2019 |
| EP | 3272679 B1 | 10/2020 |

OTHER PUBLICATIONS

Zeyuan Sun, Autonomous Assembly Method of 3-Arm Robot to Fix the Multipin and Hole Load Plate on a Space Station, 2021, p. 1-5 (Year: 2021).*

(Continued)

*Primary Examiner* — Ibrahim N El-Bathy
(74) *Attorney, Agent, or Firm* — Alston & Bird LLP

(57)          ABSTRACT

Various embodiments are directed to a shuttle assembly configured for use in an automated storage and retrieval system. In various embodiments, the shuttle assembly comprises a first shuttle unit comprising a first load bed; and a second shuttle unit comprising a second load bed, wherein the shuttle assembly is operable in an assembled configuration defined by the first shuttle unit and the second shuttle unit being operatively connected to one another such that the first shuttle unit and the second shuttle unit are configured to move together along a shuttle path defined by one or more guide rails, and wherein the shuttle assembly is selectively configurable between the assembled configuration and a split configuration defined by the first shuttle unit and the second shuttle unit being detached from one another such that the first and second shuttle units are moveable independent of one another along respective guide rails.

20 Claims, 14 Drawing Sheets

(56) References Cited

U.S. PATENT DOCUMENTS

| | | | |
|---|---|---|---|
| 2020/0148474 A1 | 5/2020 | Salichs et al. | |
| 2021/0032026 A1* | 2/2021 | Lindbo | ............... B65G 1/0414 |

OTHER PUBLICATIONS

Addverb, "Automation Solutions That Deliver", 2024 Medius Multi-Level Shuttle Brochure retrieved from the Internet at https://addverb.com/wp-content/uploads/2023/10/Brochure-2024.pdf on Sep. 17, 2024, 24 pages.

Addverb, "Multi-Level Shuttle: Medius" retrieved from the Internet at https://addverb.com/multi-level-shuttle/ on Sep. 17, 2024, 3 pages.

Invata Intralogistics, "Multi-Level Automated Storage System", posted May 14, 2013 to YouTube's MSI Automate Channel, viewed on the Internet at https://www.youtube.com/watch?v=UUhfBqQ1ZHU on Sep. 17, 2024, 2 pages.

* cited by examiner

AUTOMATED SHUTTLE ASSEMBLY AND METHODS OF USING THE SAME

CROSS-REFERENCE TO RELATED APPLICATIONS

This application claims priority pursuant to 35 U.S.C. 119(a) to Indian application Ser. No. 202311013766, filed Mar. 1, 2023, which application is incorporated herein by reference in its entirety.

FIELD OF THE INVENTION

Example embodiments of the present invention relate generally to material handling of containers, packages, discrete articles and/or other objects, and more specifically to techniques for moving objects stored at a storage rack via a shuttle.

BACKGROUND

Automated materials handling systems utilized in material handling environments that utilize automation, software, and labor to optimize the productivity and throughput in a variety of operations. Furthermore, various materials handling systems provide flexibility and speed allowing use in applications ranging from e-commerce and omnichannel fulfillment to article distribution. Such materials handling systems utilize automated shuttles moving throughout the system between storage racks to retrieve stored objects from discrete storage locations within those storage racks. Automated shuttles used in materials handling systems may experience challenges in effectively retrieving, handling, and/or otherwise transporting objects having a unique and/or unconventional characteristic such as, for example, size, shape, storage position, and the like. Applicant has identified several technical challenges associated with utilizing automated shuttles in materials handling systems to retrieve objects stored at discrete storage locations within a storage rack arrangement. Through applied effort, ingenuity, and innovation, many of these identified challenges have been overcome by developing solutions that are included in embodiments of the present invention, many examples of which are described in detail herein.

BRIEF SUMMARY

Various embodiments are directed to shuttle assemblies configured for use in a materials handling system and methods of using the same. In various embodiments, the shuttle assembly configured for use in an automated storage and retrieval system may comprise a first shuttle unit comprising a first load bed having a first width defined between a first set of opposing lateral load arms; and a second shuttle unit comprising a second load bed comprising a second width defined between a second set of opposing lateral load arms; wherein the shuttle assembly is operable in an assembled configuration defined at least in part by the first shuttle unit and the second shuttle unit being operatively connected to one another such that the first shuttle unit and the second shuttle unit are configured to move together along a shuttle path defined by one or more guide rails of the automated storage and retrieval system; and wherein the shuttle assembly is selectively configurable between the assembled configuration and a split configuration, the split configuration being defined at least in part by the first shuttle unit and the second shuttle unit being detached from one another such that the first shuttle unit is moveable independent of the second shuttle unit along a first shuttle path defined by a first guide rail and the second shuttle unit is moveable independent of the first shuttle unit along a second shuttle path defined by a second guide rail.

In various embodiments, the shuttle assembly may further comprise a moving mechanism configured to interact with an object disposed on the shuttle assembly to facilitate a selective repositioning of the object between the first load bed of the first shuttle unit and the second load bed of the second shuttle unit. In certain embodiments, the moving mechanism may comprise a first set of hinged load arms rotatably secured to at least a portion of the first shuttle unit and a second set of hinged load arms rotatably secured to at least a portion of the second shuttle unit, wherein each of the first set of hinged arms and the second set of hinged arms defined by the moving mechanism is operable to execute one of a first repositioning of the object from the first load bed to the second load bed and a second repositioning of the object from the second load bed to the first load bed.

In various embodiments, the shuttle assembly may be configured such that in the split configuration, the first shuttle unit is operable to execute a first material handling operation with respect to a first object and the second shuttle unit is operable to execute a second material handling operation with respect to a second object. In certain embodiments, the first material handling operation and the second material handling operation may define at least substantially simultaneous operations. In various embodiments, the first shuttle unit may comprise a first lifting mechanism operable to move a between a first retracted configuration and a first extended configuration in order to cause the first load bed to move through a first vertical range of motion defined between a first nominal position and a first raised position; and wherein the second shuttle unit comprises a second lifting mechanism operable to move a between a second retracted configuration and a second extended configuration in order to cause the second load bed to move through a second vertical range of motion defined between a second nominal position and a second raised position. In certain embodiments, the first vertical range of motion may be defined relative to a first shuttle body of the first shuttle unit, and wherein the second vertical range of motion is defined relative to a second shuttle body of the second shuttle unit.

In various embodiments, the first load bed of the first shuttle unit may be defined at least in part by a first width defined in a lateral direction between a first set of opposing lateral load arms; and wherein the second load bed of the second shuttle unit is defined at least in part by a second width defined in the lateral direction between a second set of opposing lateral load arms. In certain embodiments, the assembled configuration of the shuttle assembly may be defined at least in part by the first shuttle unit being positioned at least substantially adjacent the second shuttle unit such that the first load bed of the first shuttle unit and the second load bed of the second shuttle unit collectively define a composite load bed. Further, in certain embodiments, the composite load bed may be defined by an arrangement of the first load bed and the second load bed in an at least substantially coplanar arrangement. In certain embodiments, the composite load bed is defined by an arrangement of the first load bed and the second load bed in a side-by-side arrangement wherein a first bed length defined by the first load bed and a second bed length defined by the second load bed collectively define a composite length arranged in the longitudinal direction perpendicular to the first width of the first shuttle unit and the second width of the second shuttle unit.

In various embodiments, the shuttle assembly may further comprise an attachment assembly configurable in an engaged configuration to facilitate the selective connection of the first shuttle unit to the second shuttle unit to secure the shuttle assembly in the assembled configuration. In certain embodiments, the attachment assembly may comprise one or more actuator arms configurable between a retracted configuration and an extended configuration, the attachment assembly being configured such that the extended configuration is defined by the one or more actuator arms extending from the first shuttle unit to physically engage at least a portion of the second shuttle unit. In certain embodiments, the attachment assembly may be configurable in a disengaged configuration to facilitate a selective detachment of the second shuttle unit from the first shuttle unit to enable an independent movement of the second shuttle unit relative to the first shuttle unit. In certain embodiments, the shuttle assembly may further comprise a position sensor, wherein the shuttle assembly is configured to selectively configure the attachment assembly between the disengaged configuration and the engaged configuration based at least in part on data captured by the position sensor. Further, in certain embodiments, the position sensor may be defined by a proximity sensor provided at the first shuttle body of the first shuttle unit such that the proximity sensor is configured to detect an instance wherein the second shuttle unit is in an at least substantially adjacent position relative thereto.

In various embodiments, the first shuttle unit may be dynamically engaged with a first guide rail and configured to define a first range of motion along a first length of the first guide rail, wherein the second shuttle unit is dynamically engaged with a second guide rail and configured to define a second range of motion along a second length of the second guide rail, and wherein the first guide rail and the second guide rail are arranged in an at least substantially parallel configuration relative to one another. In various embodiments, the first shuttle unit may comprise a first wheel assembly that is dynamically engaged with a rail assembly of the AS/RS to facilitate movement of the first shuttle unit along a length of the rail assembly, and wherein the second shuttle unit comprises a second wheel assembly that is dynamically engaged with the rail assembly of the AS/RS to facilitate movement of the second shuttle unit along the length of the rail assembly. In certain embodiments, the first wheel assembly may be configured to dynamically engage the first guide rail such that the first shuttle unit is configured for movement through an at least partially curved portion defined by the first guide rail. Various embodiments are directed to an automated storage and retrieval system comprising the shuttle assembly.

BRIEF DESCRIPTION OF THE DRAWINGS

Reference will now be made to the accompanying drawings, which are not necessarily drawn to scale, and wherein.

4

Figure 3A:
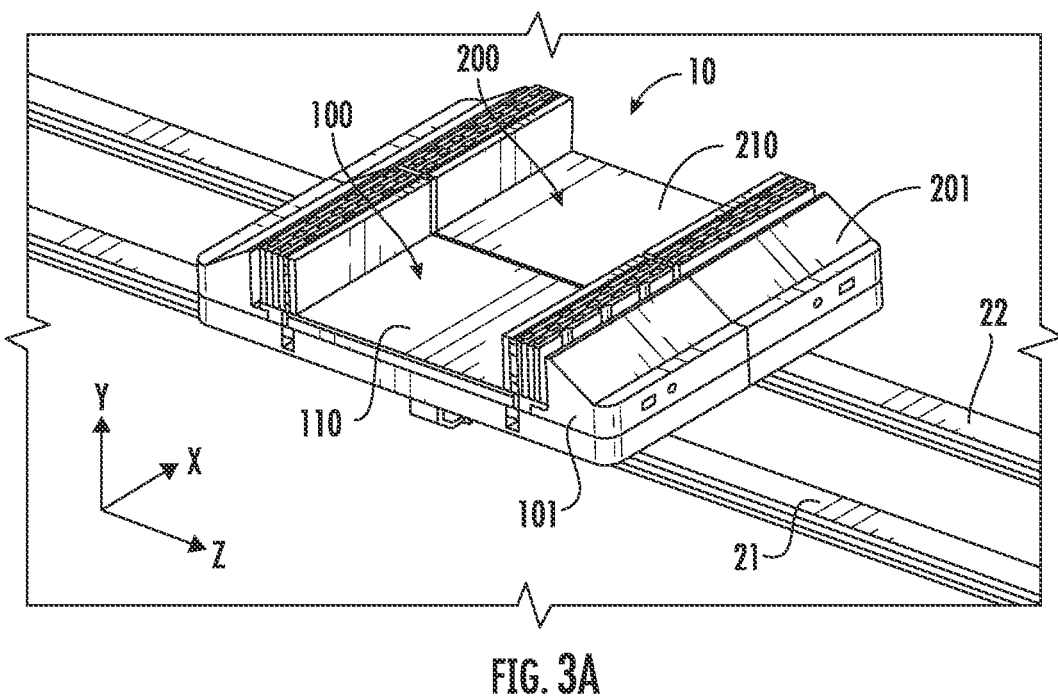
Figure 3B:
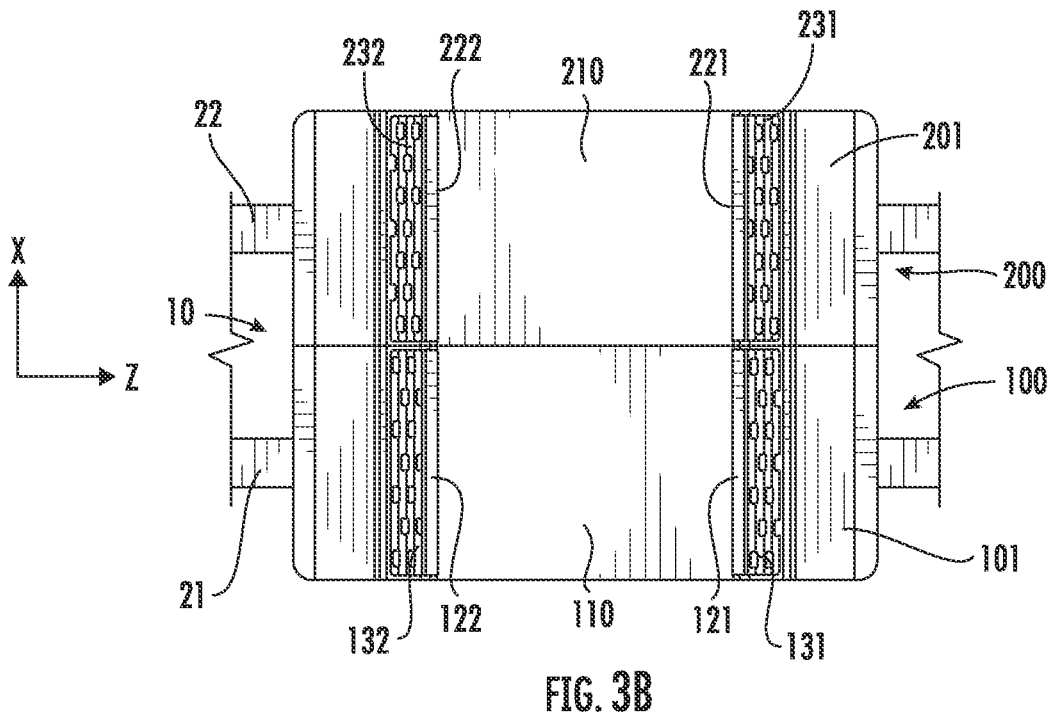
Figure 3C:
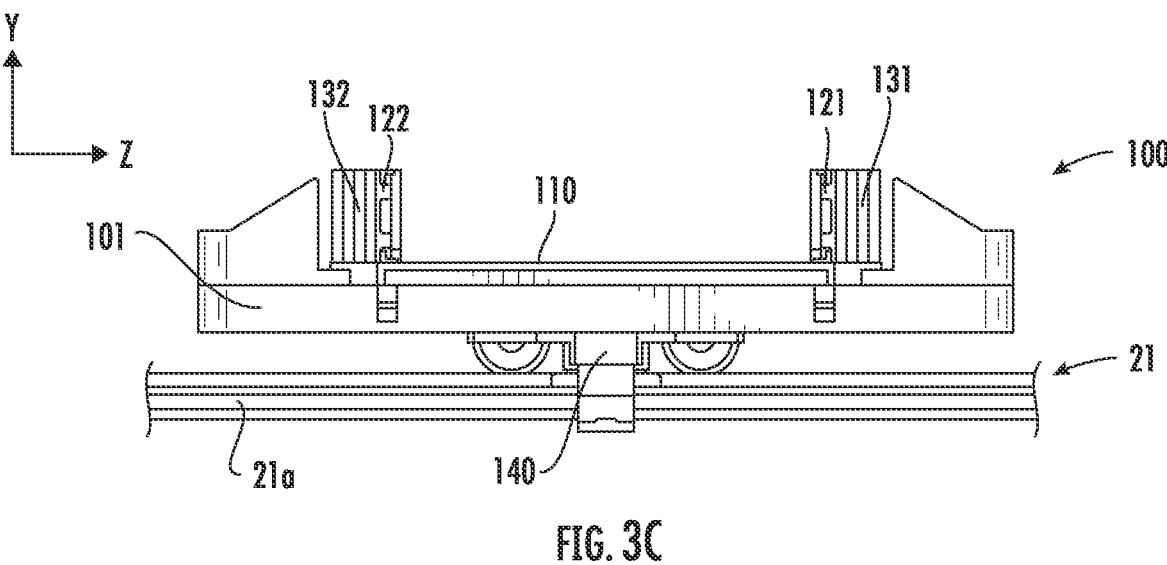
Figure 3D:
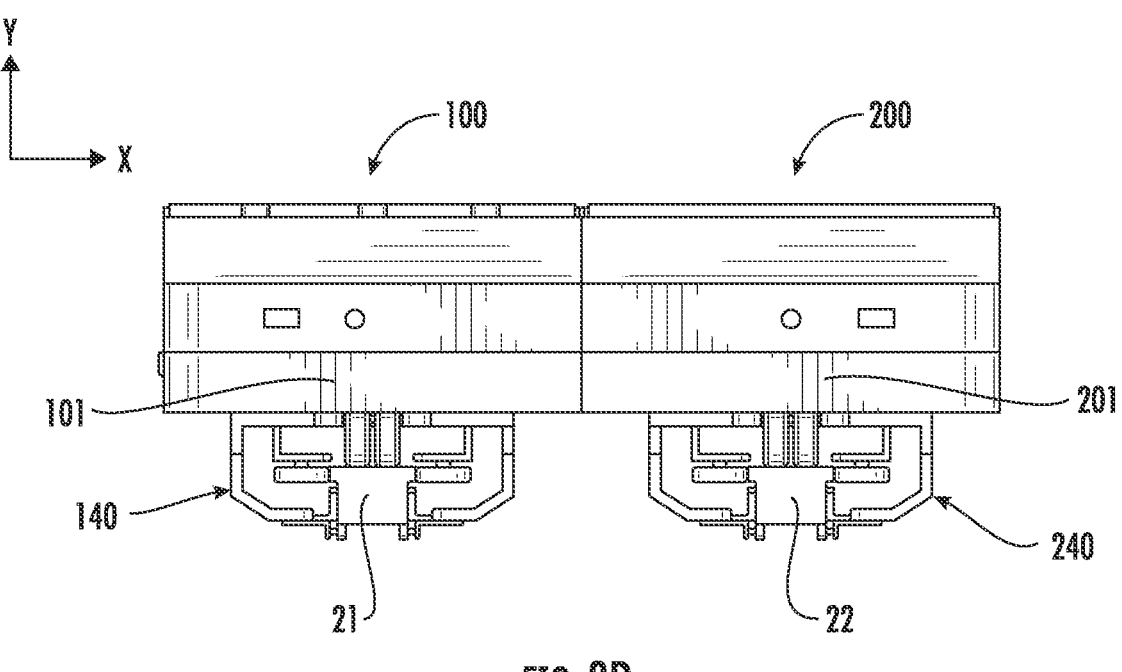
Figure 3E:
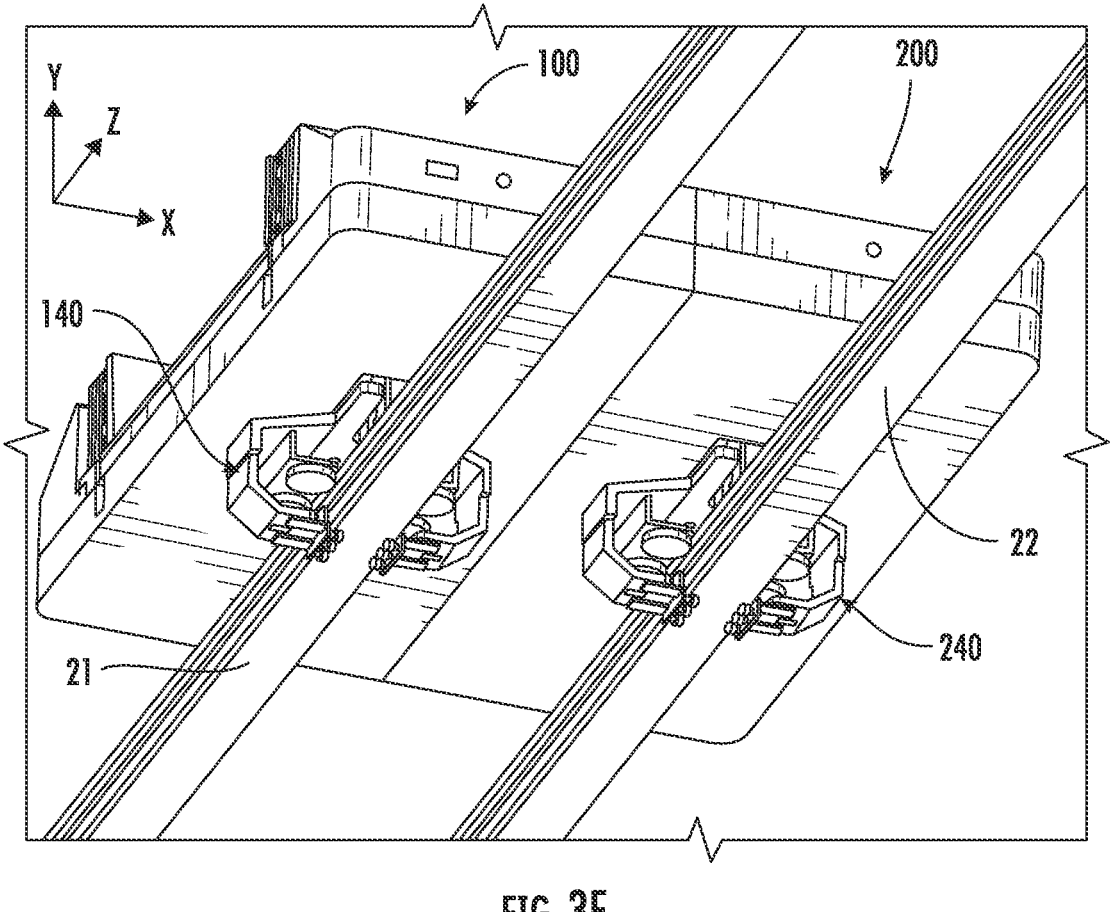
Figure 4A:
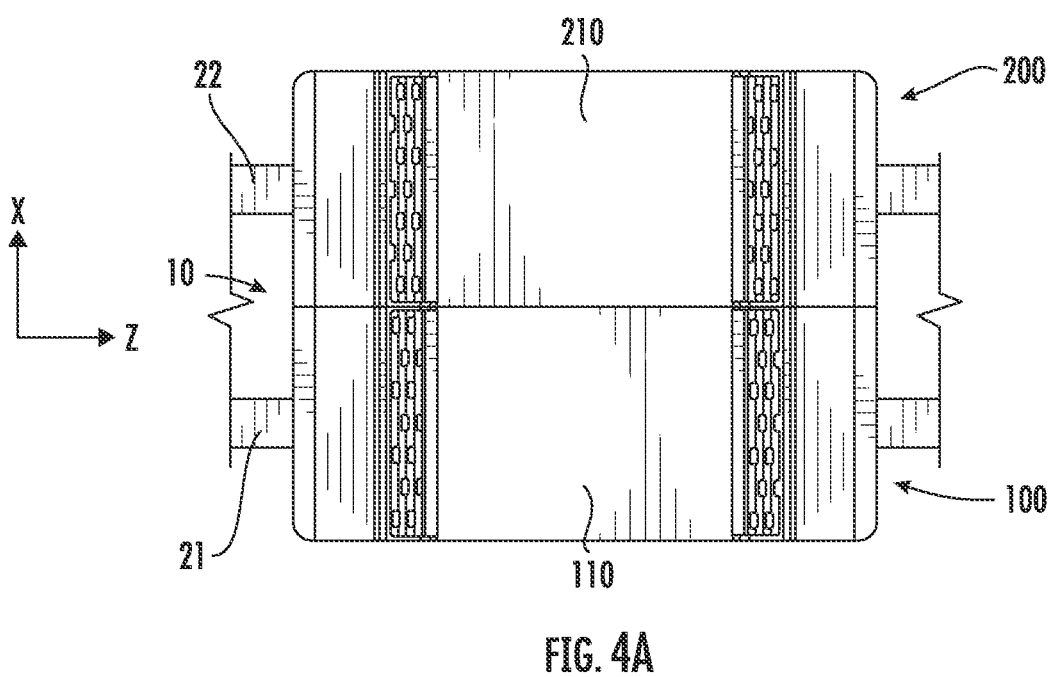
Figure 4B:
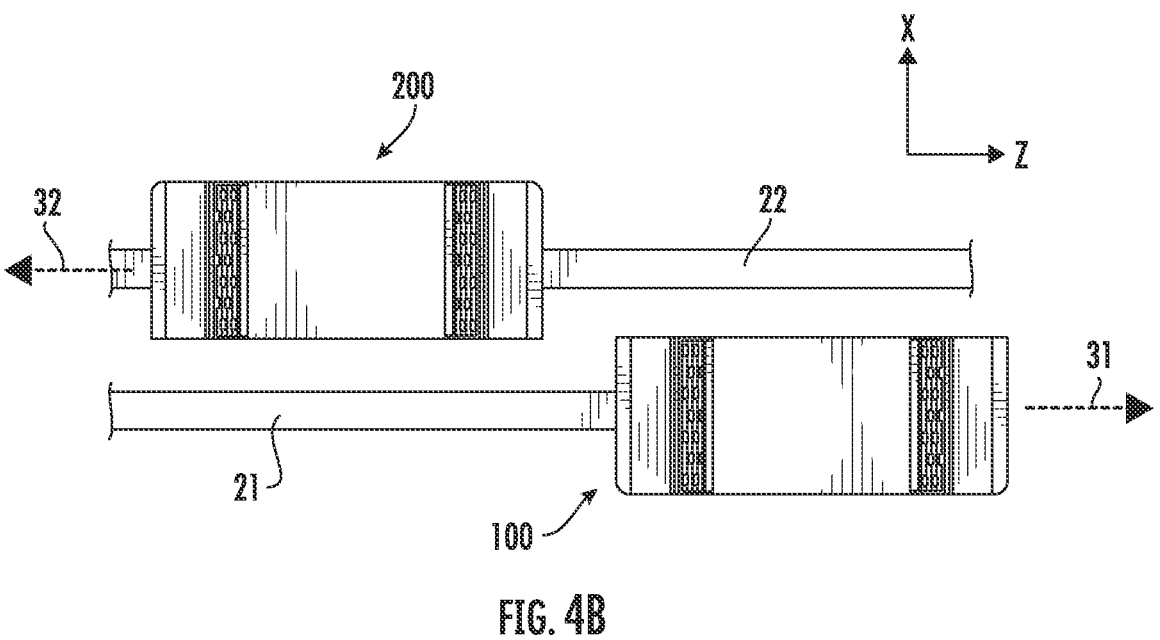
Figure 5A:
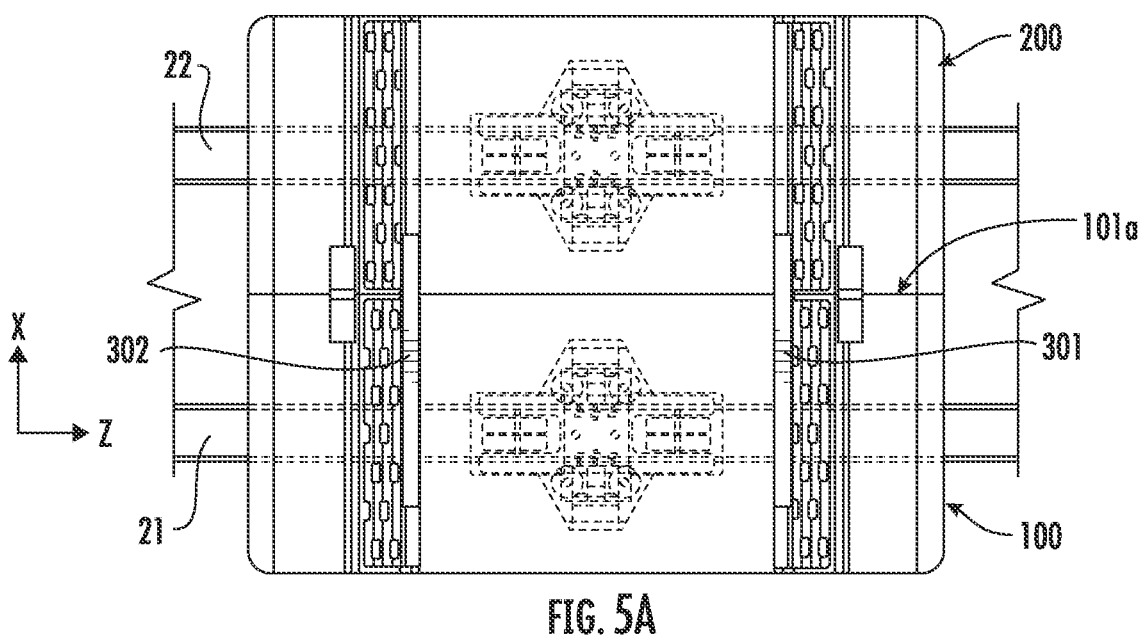
Figure 5B:
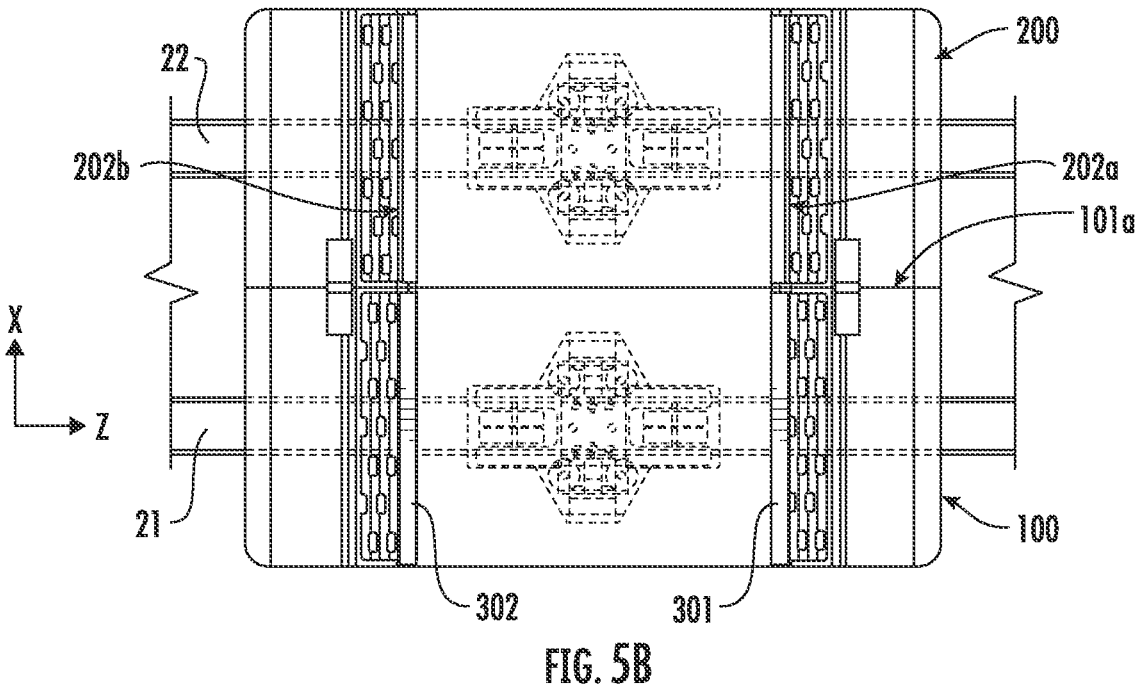
Figure 6:
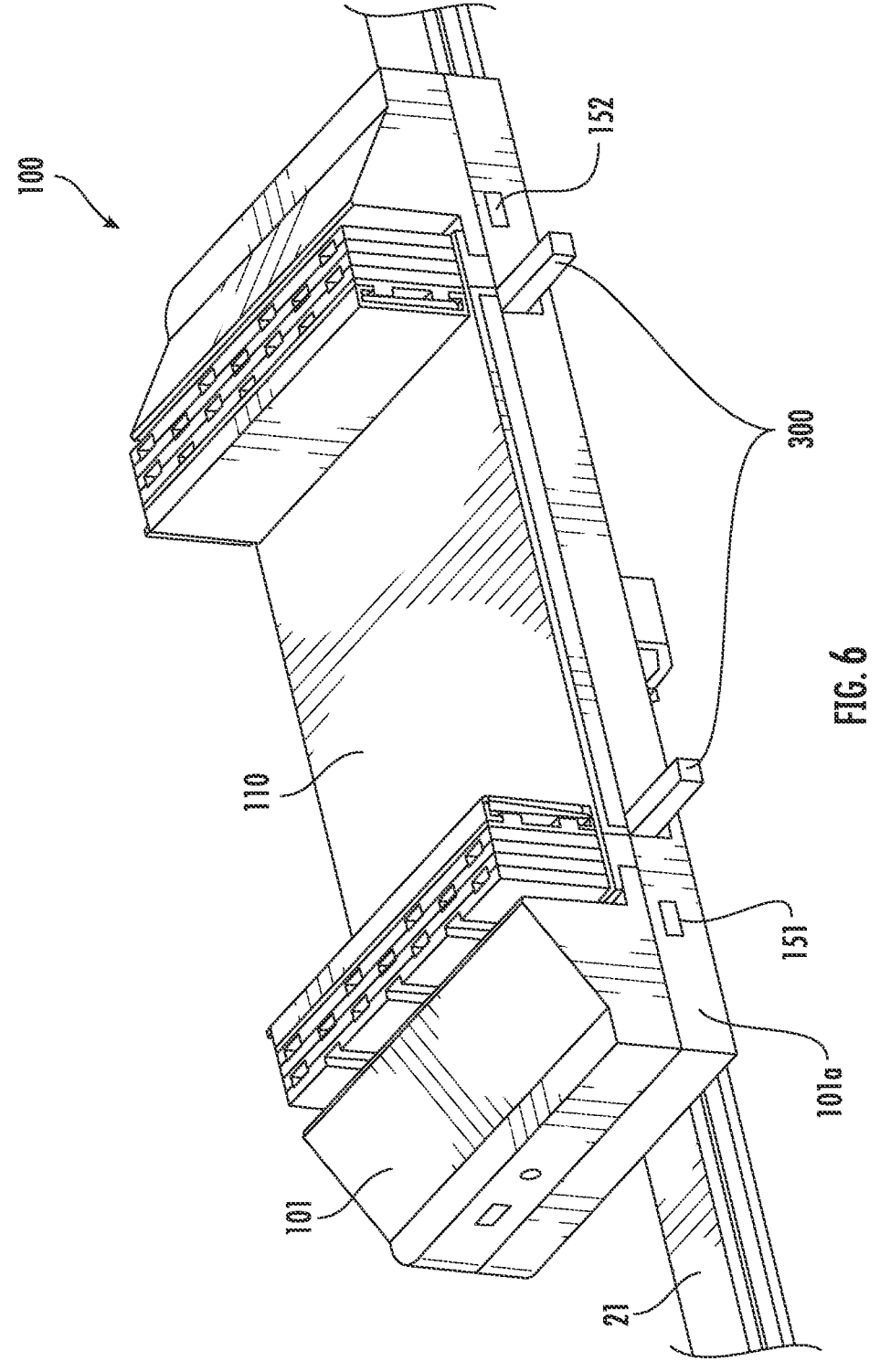
Figures 7A, 7B, 7C:
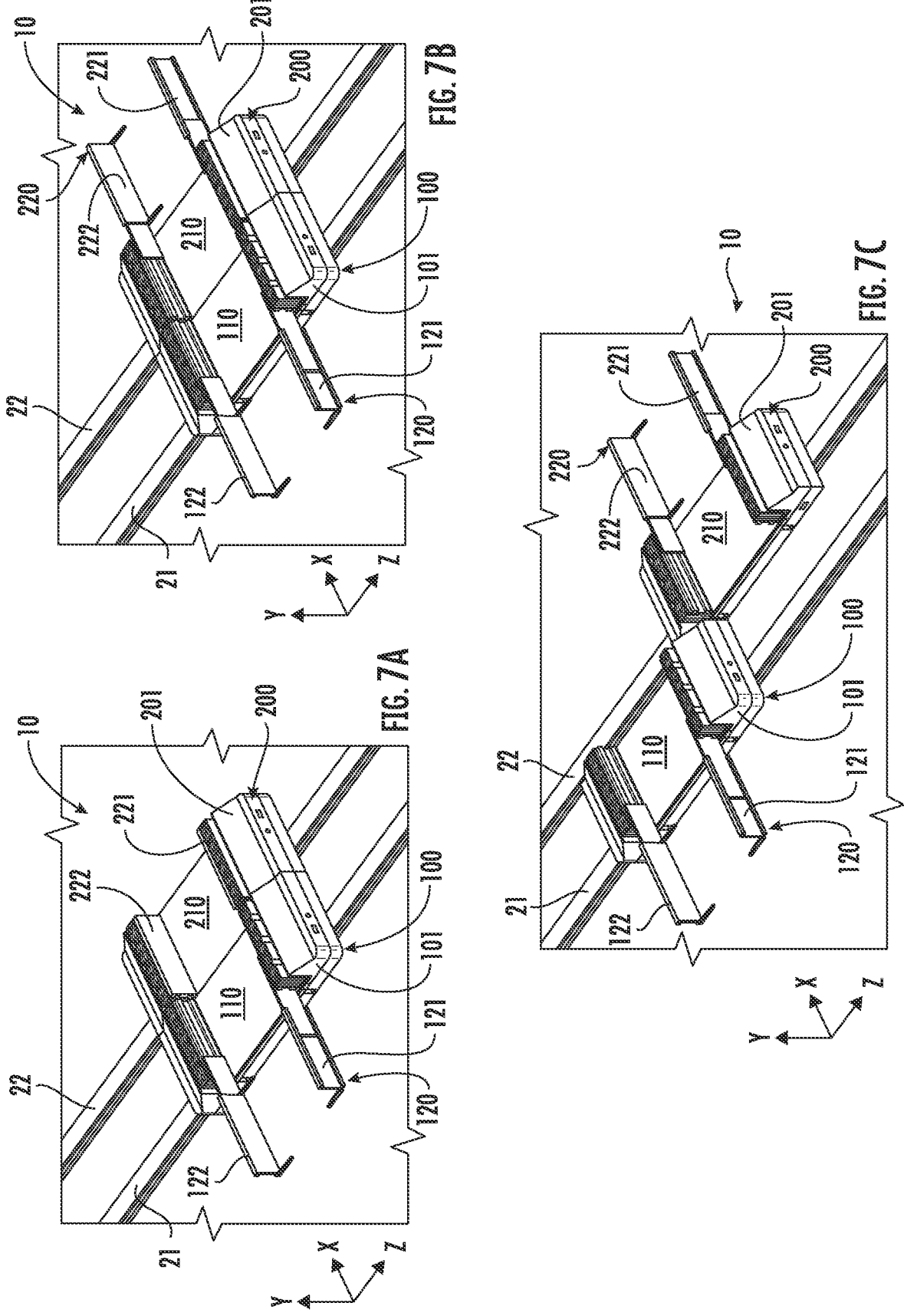
Figure 8A:
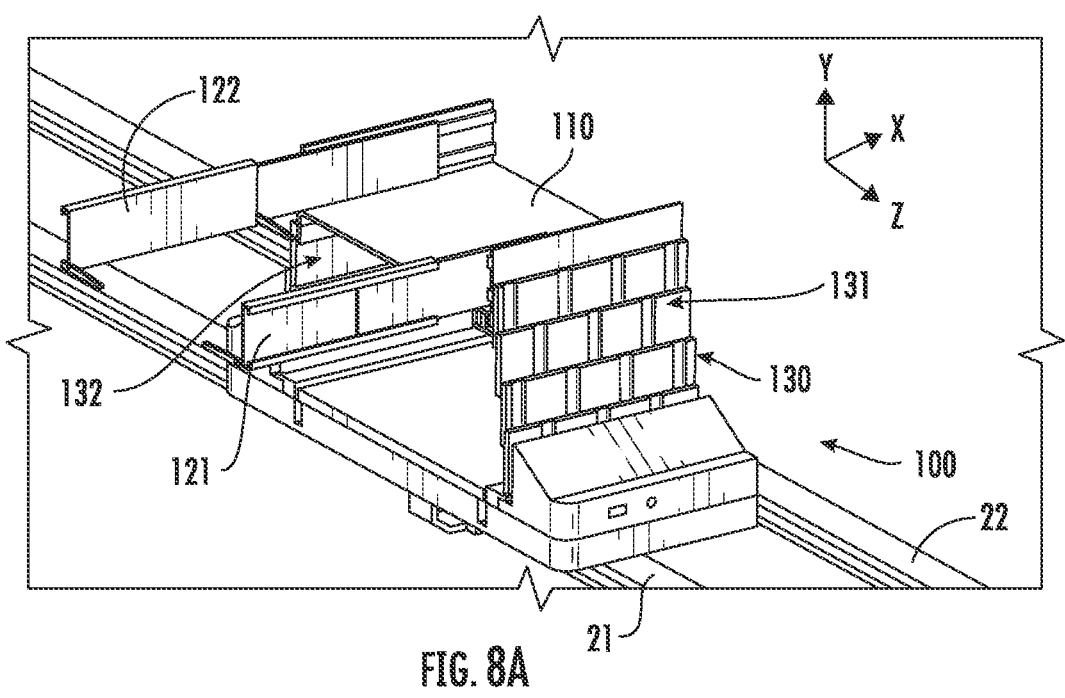
Figure 8B:
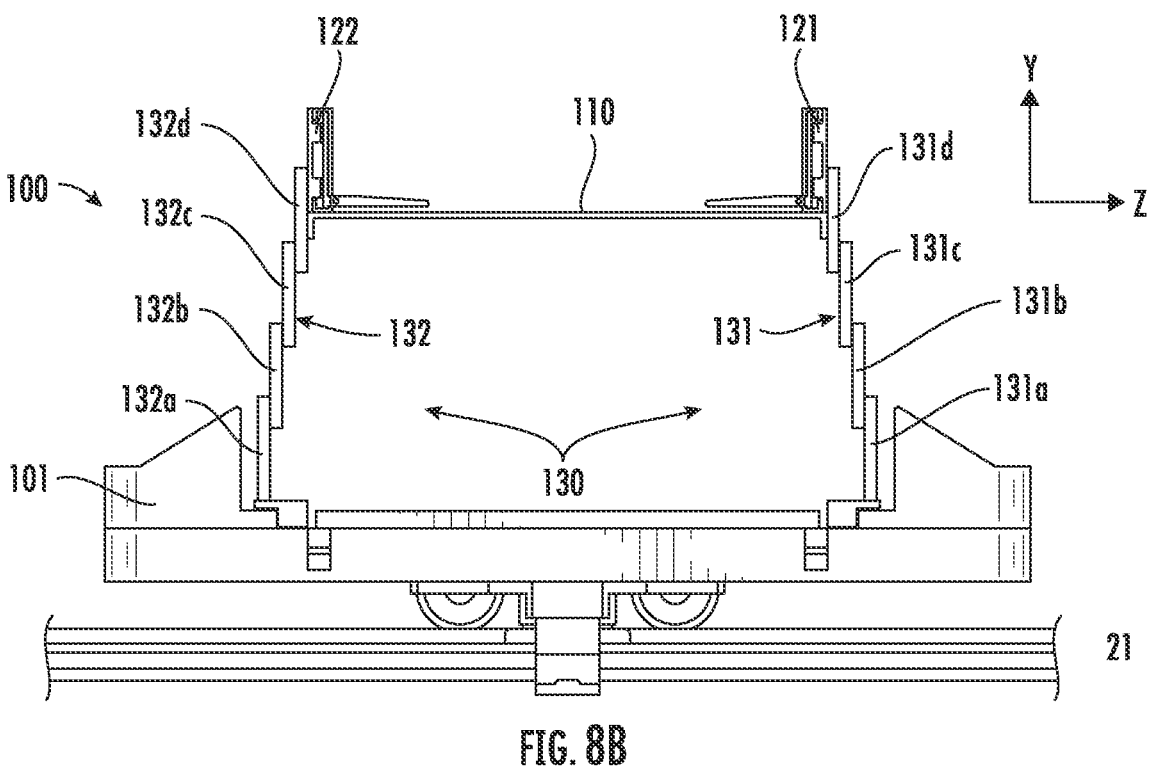
Figures 9A, 9B, 9C:
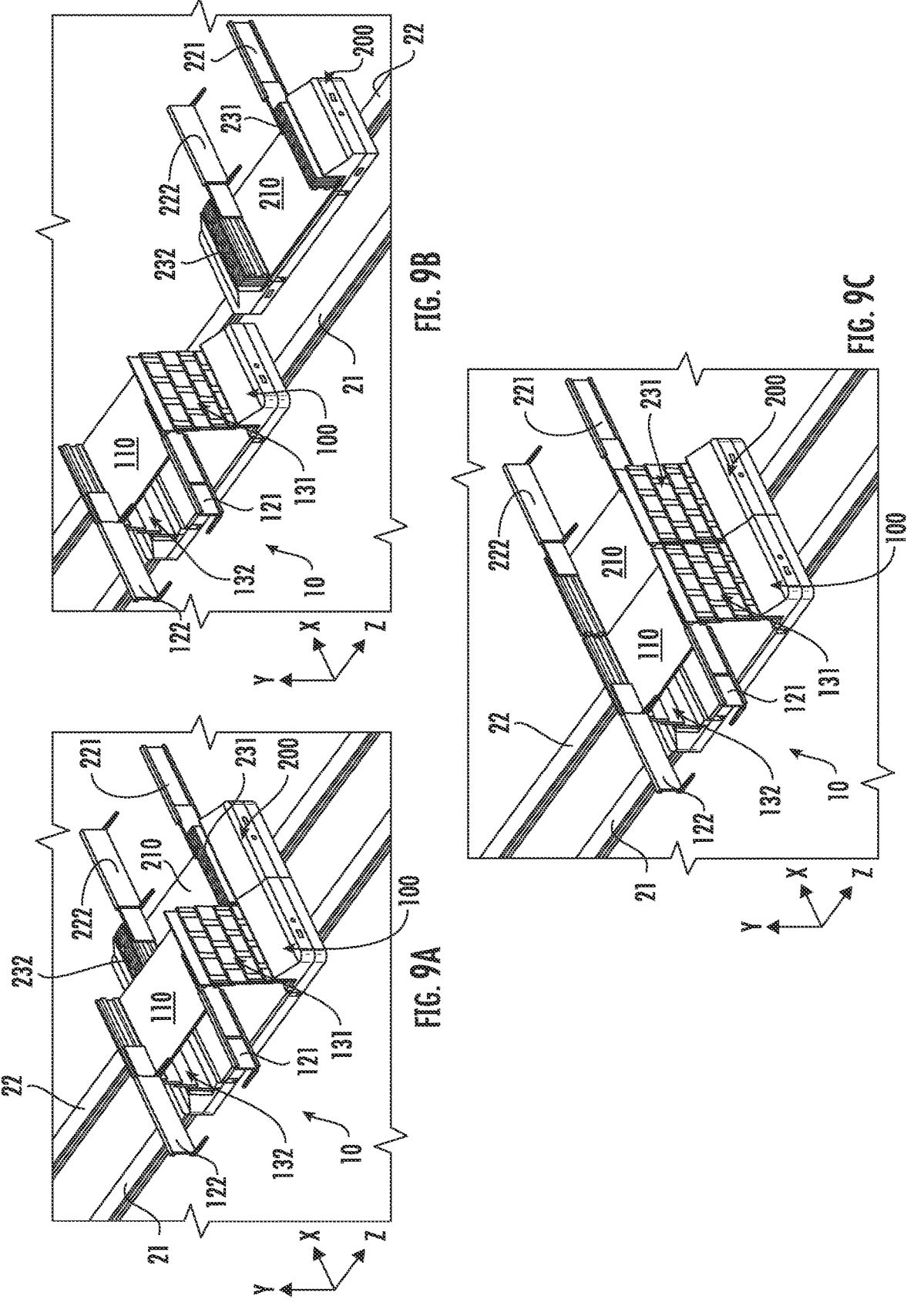
Figures 10A, 10B, 10C:
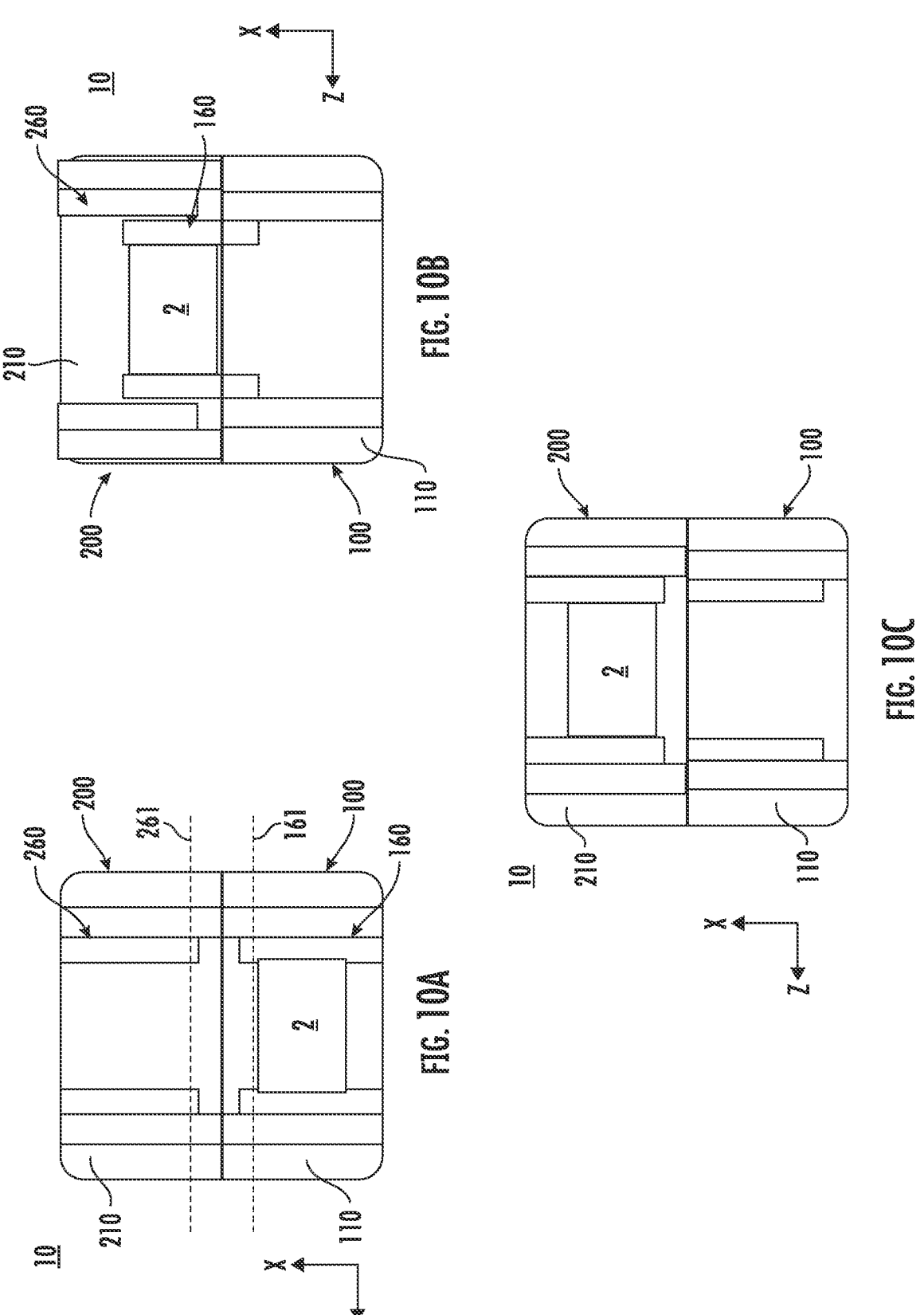
Figures 11A, 11B:
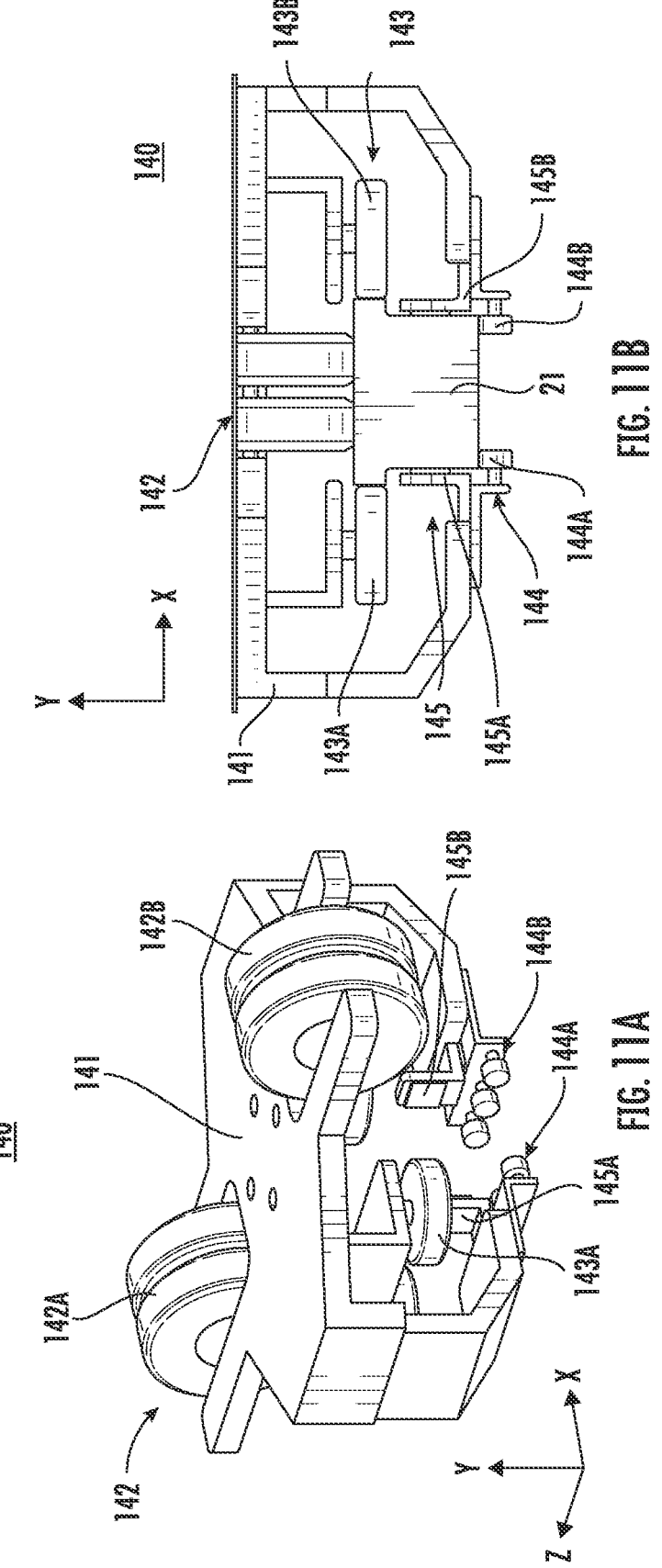
Figure 12:
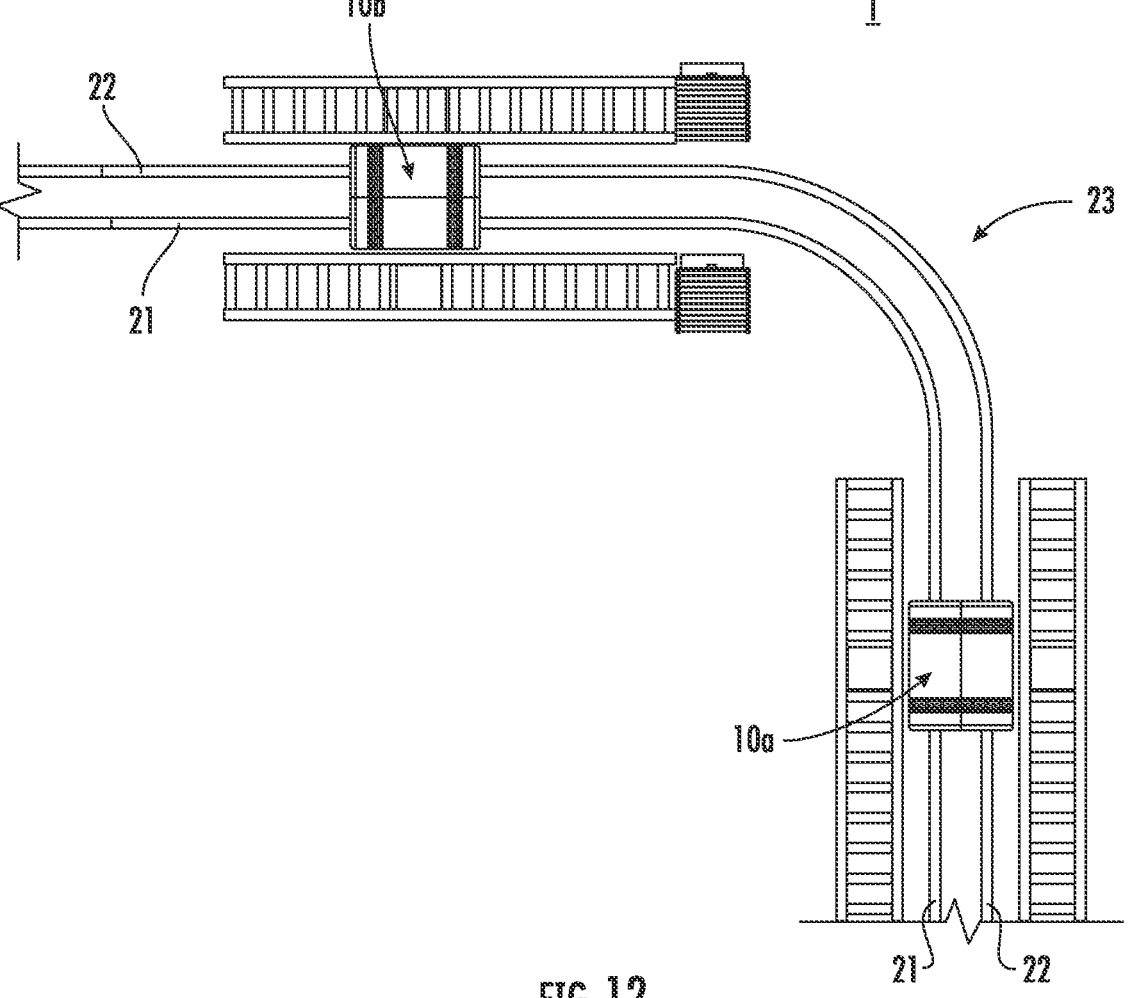

FIGS. 3A-3E illustrate perspective views of an exemplary shuttle assembly according to various embodiments described herein FIGS. 4A-4B illustrate top perspective views of an exemplary shuttle assembly operable within a materials handling system in accordance with various embodiments described herein;

FIGS. 5A and 5B illustrate top cross-sectional views of an exemplary shuttle assembly according to various embodiments described herein;

FIG. 6 illustrates an isolated perspective view of a shuttle unit of an exemplary shuttle assembly according to various embodiments described herein;

FIGS. 7A-7C illustrate perspective views of an exemplary shuttle assembly according to various embodiments described herein;

FIGS. 8A-8B illustrate isolated views of a shuttle unit of an exemplary shuttle assembly according to various embodiments described herein;

FIGS. 9A-9C illustrate perspective views of an exemplary shuttle assembly according to various embodiments described herein;

FIGS. 10A-10C illustrate schematic top views of an exemplary shuttle assembly in accordance with various embodiments described herein;

FIGS. 11A-11B illustrate various views of a wheel assembly defined by a shuttle unit of an exemplary shuttle assembly in accordance with various embodiments described herein; and FIG. 12 illustrates a top schematic view of a curved guide rail portion of a materials handling system through which an exemplary shuttle assembly is configured to travel in accordance with various embodiments described herein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Figure 1:
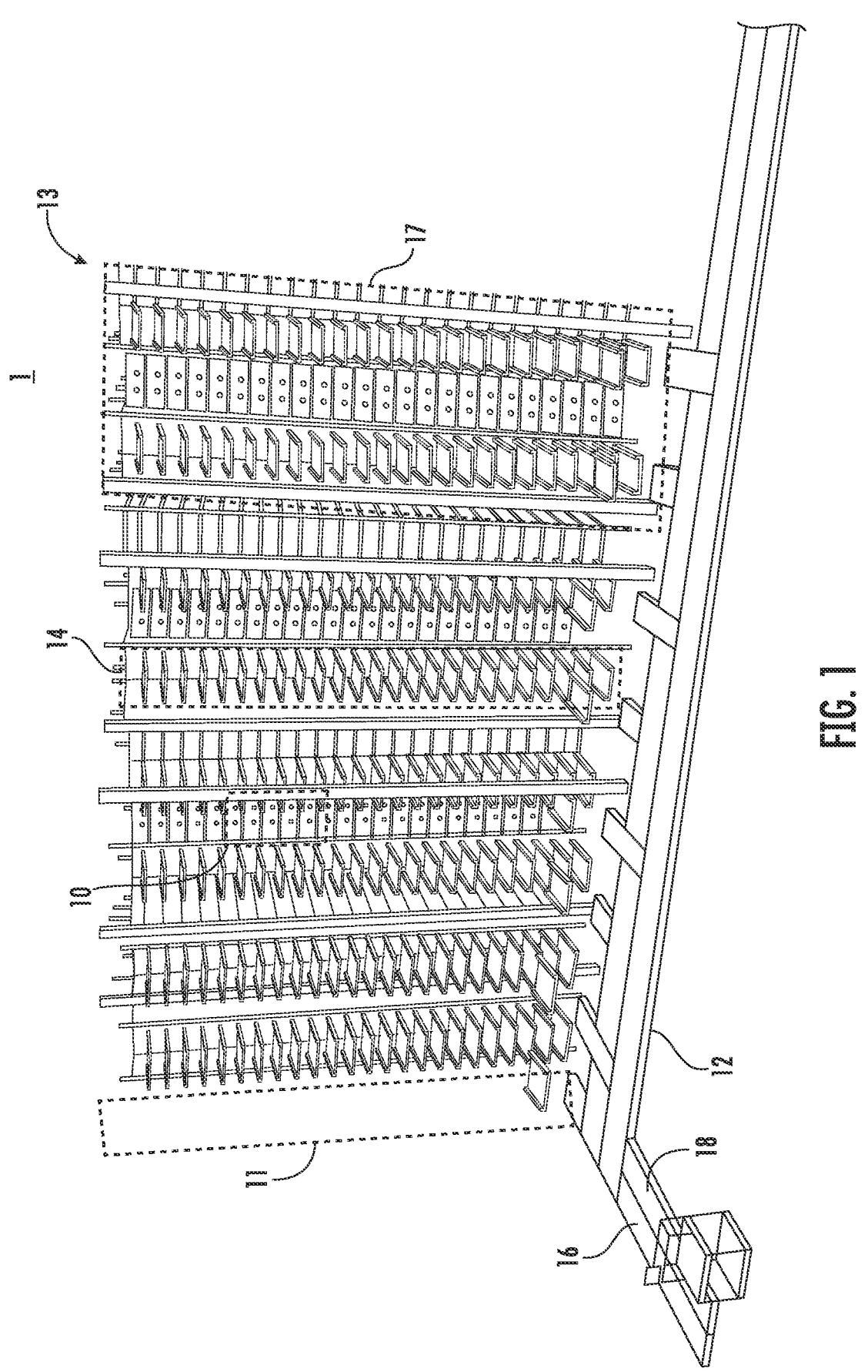
FIG. 1 illustrates a perspective view of an exemplary materials handling system according to various embodiments described herein.

FIG. 1 illustrates a perspective view of an exemplary materials handling system according to various embodiments described herein. In particular, FIG. 1 illustrates a material handling system 1 that includes an automated storage and retrieval system (AS/RS). A storage rack 13 of the materials handling system 1 may be defined as a series of vertically arranged shelves, each supported by a support frame. The support frame may comprise vertical support members separating various levels within the storage rack 13, and horizontal support members supporting individual shelves. Each shelf may define and/or comprise one or more bay, each bay may encompass a plurality of storage locations configured for storing at least one object (e.g., a storage container, a product, a spool, and/or other object configurations) therein. In various embodiments, a materials handling system 1 (e.g., an AS/RS) may define one or more aisles 17 defined between two adjacent storage racks 13 with one or more shuttle assemblies 10 defined therein to remove and/or place objects into storage locations within the storage rack. As shown, the objects may be moved between different levels via lifts 11 and/or to and from pickup and deposit stations 14. In an example embodiment, the objects may be received by the system at pickup and deposit stations 14 from an in-feed conveyor via a product delivery system and a corresponding lift interface.

As described herein, in various embodiments, each shelf within a storage rack 13 of a materials handling system 1 (e.g., an AS/RS) may comprise a storage location. For example, each level of a storage rack 13 may be divided into storage locations which may be defined as a physical space on the shelf where an object may be stored. For example, in various embodiments, an object may be any type of container used in a materials handling system, such as a carton, a case, a tote, a divided tote, a tray, a pallet, or the like. In various embodiments, as discussed herein the storage location may be defined by a storage depth and a storage width configured such that the storage location is capable of holding one or more objects. Various shelves may have various configurations with storage locations having different sizes and/or depths based on the given configuration (e.g., the size and shape of a given object). For example, in various embodiments, a storage location may define a sufficient depth for multiple objects such that the objects are disposed into the storage locations such at varying depths (e.g., the last object placed in the storage location may block any other objects in the storage location from being removed from said storage location).

As a non-limiting example, in various embodiments, a storage rack of an exemplary materials handling system may be configured such that each storage location defined by the rack is capable of holding at least two objects. In such an embodiment, a first object may define a first depth that is shallower (e.g., less deep and/or shorter) than the second depth defined by the second object disposed within in the same storage location. In such an exemplary configuration, the second object cannot be removed from the storage location via the shuttle assembly without the shuttle first removing the first object. Traditional shuttles are configured such that the first object must be either carried along with the second object or moved to another "reserved" storage location within the storage rack (e.g., a different storage location within a bay or a different storage location in a different bay). As such, the multi-depth storage locations may require additional movement of a shuttle assembly and/or additional storage locations defined within the rack.

In various embodiments, a materials handling system 1 may comprise at least one automated shuttle assembly 10 configured to travel along a shuttle guide track provided within one or more aisle 17, racks 13, and/or the like of the materials handling system 1 (e.g., an AS/RS defined therein) to facilitate the retrieval, storage, and/or transportation of various objects throughout the materials handling system 1. For example, in order to remove and/or place objects into various storage locations of a storage rack 13, the materials handling system 1 may use a shuttle assembly 10 configured to retrieve an object from the storage rack 13 (e.g., the storage location), as described herein. In some embodiments, the shuttle assembly 10 may be disposed between two storage racks 13, such that the shuttle may retrieve one or more objects in any storage location of the two storage racks 13 along a given level (e.g., a load arm(s) of a shuttle may extend towards either of the two storage racks 13). For example, two adjacent storage racks may be separated sufficiently to allow the shuttle to move therebetween. Further, an exemplary storage location defined within a storage rack 13 may be configured such that an object stored therein may be retrieved, disposed, and/or otherwise engaged by an exemplary shuttle assembly 10.

Figure 2:
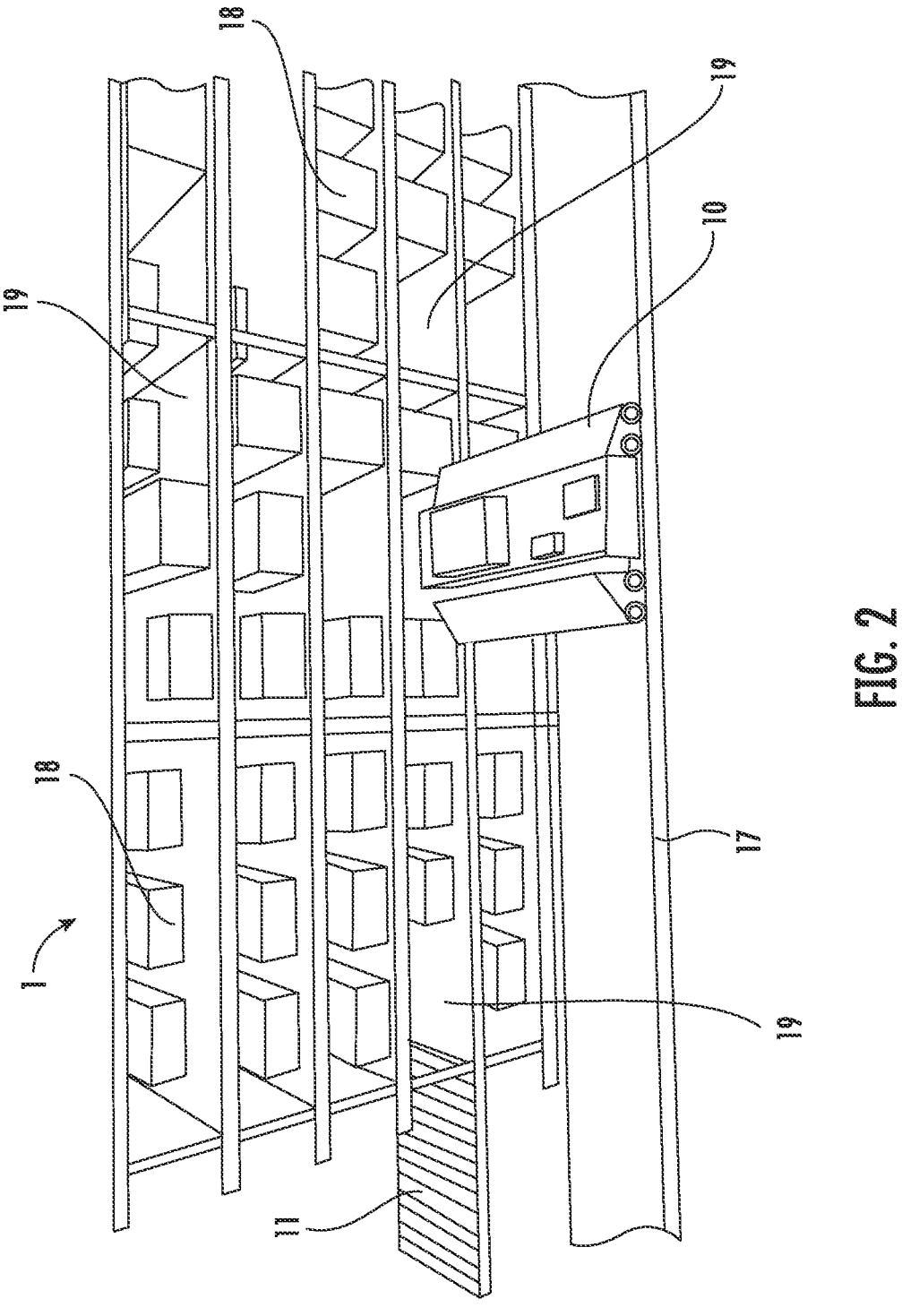
FIG. 2 illustrates a perspective view of an exemplary shuttle assembly positioned within an aisle of a materials handling system in accordance with various embodiments described herein.

For example, FIG. 2 illustrates a perspective view of an exemplary shuttle assembly 10 positioned within an aisle of a materials handling system 1 according to one or more embodiments. In particular, FIG. 2 illustrates that a materials handling system 1 can include a shuttle assembly 10 that travels along the one or more aisles 17 to service storage locations 19 defined within the at least one storage rack 13 positioned adjacent the aisle 17. A vertical lift 11 may leave one or more objects 18 at a pickup and deposit adjacent the lift on an assigned level and aisle 17 within the materials handling system (e.g., extending between adjacent storage racks 13). A shuttle assembly 10 may be configured to pick up the one or more objects 18 at the pickup and deposit station adjacent the lift 11 and support the one or more objects on a load bed of the shuttle assembly, as described in further detail herein, as the shuttle assembly 10 moves along the aisle 17 to transport the object(s) 18 to an assigned storage location 19 defined within a designated storage rack 13 along the aisle 17 and place the one or more objects therein for storage. In various embodiments, as described herein, an exemplary shuttle assembly 10 may be configured to retrieve one or more objects 18 from a particular assigned storage location 19 and move them to the pickup and deposit station adjacent the lift 11 station as part of a retrieval operation.

In order to remove and/or place objects into various storage locations of the storage rack 104, the material handling system 100 may use a shuttle 114 configured to retrieve one or more objects from the storage rack 104. An example shuttle assembly 10 is shown in FIG. 2. In various embodiments, the shuttle assembly 10 may be a self-contained unit, receiving power (e.g., 48 VDC) from a bus bar located inside the shuttle guide track (e.g., the one or more guide rails with which the shuttle assembly is dynamically and/or slidably engaged) that may be arranged along the aisles 17 defined adjacent one or more storage racks 13. In various embodiments, the one or more guide rails provided along an aisle 17, as described herein, may define a power guide track (e.g., 48 VDC power supplied to the track) may be powered from a DC power panel. In various embodiments, a shuttle assembly 10 may receive control system commands over a Wireless Local Area Network (WLAN).

As described herein, an exemplary shuttle assembly 10 may be configured with sensors configured move to an intended storage location and/or engage with an object in a given storage location 19. For example, the shuttle assembly 10 may be equipped with a position sensor (e.g., a proximity sensor) to determine the location of the shuttle assembly 10 along the guide rails provided along the aisle 17 and/or to determine the depth of a given object 18 within a storage location 19. In various embodiments, the shuttle assembly 10 may also be equipped with sensors and onboard devices, such as Wi-Fi antenna for communication with a Warehouse Control System (WCS), overload protection, one or more power supplies (e.g., 24 Volt power supply and/or 48 volt power supply), digital input and output modules, and/or the like.

FIGS. 3A-3E illustrate perspective views of an exemplary shuttle assembly according to various embodiments described herein. In particular, FIGS. 3A-3E illustrate an exemplary shuttle assembly 10 configured to facilitate storage and/or retrieval of an object within a materials handling system 1 by handling the object and transporting the object to and/or from a storage location within the system 1, such as, for example, a storage location defined within a storage rack. For example, as described herein, an exemplary shuttle assembly 10 may be configured to retrieve an object from a storage location within an exemplary materials handling system 1, transport the retrieved object to another second storage location within the materials handling system 1, and provide (e.g., dispense) the object at the second storage location.

As illustrated, in various embodiments, an exemplary shuttle assembly 10 may comprise a first shuttle unit 100 and a second shuttle unit 200 that are each slidably engaged with a respective guide rail (e.g., a first guide rail 21, a second guide rail 22) and configured for selective detachment relative to one another to define a split configuration of the shuttle assembly 10 wherein the first shuttle unit 100 and the second shuttle unit 200 are independently moveable along the respective guide rails to facilitate an at least substantially simultaneously execution of a first handling operation and a second handling operation by the shuttle assembly 10, such as, for example, by the first shuttle unit 100 and the second shuttle unit 200, respectively. In various embodiments, the first shuttle unit 100 and the second shuttle unit 200 may be selectively attached relative to one another (e.g., via an attachment assembly) such that the shuttle assembly 10 defines an assembled configuration, wherein the first and second shuttle units 100, 200 are configured to move together along a shuttle path defined by the one or more guide rails (e.g., the first guide rail 21, the second guide rail 22) of the materials handling system 1.

In various embodiments, the shuttle assembly 10 may be selectively configured between an assembled configuration and a split configuration to enable an effective execution of one or more material handling operations based on at least one object characteristic of, such as, for example, object size, object shape, object location, and/or the like, defined by the one or more objects being transported by the shuttle assembly 10. For example, as illustrated in FIG. 3A, the shuttle assembly 10 may be selectively configured in an assembled configuration defined at least in part by the first shuttle unit 100 being positioned at least substantially adjacent the second shuttle unit 200 operatively connected thereto. In such an exemplary configuration, a first load bed 110 defined by the first shuttle unit 100 and a second load bed 210 defined by the second shuttle unit 200 may collectively define a composite load bed of the shuttle assembly 10. In various embodiments, the exemplary shuttle assembly 10 may be configured such that in the assembled configuration, the first shuttle unit 100 and the second shuttle unit 200 operatively connected thereto may be arranged in a side-by-side lateral arrangement wherein the first shuttle unit 100 defines a first lateral portion of the shuttle assembly 10 and the second shuttle unit 200 defines an opposing second lateral portion of the shuttle assembly 10. For example, when the shuttle assembly 10 defines an assembled configuration, a first lateral side (e.g., half) of the composite load bed defined by the shuttle assembly 10 may be defined by the first load bed 110 and a second lateral side (e.g., half) of the composite load bed may be defined by the second load bed 210.

In various embodiments, the first shuttle unit 100 of an exemplary shuttle assembly 10 may comprise a first shuttle unit body 101, a first load bed 110, a plurality of retractable load arms comprising a first load arm 121 and a second load arm 122 positioned along opposing longitudinal ends of the first load bed 110, and a first lifting mechanism 130 configured to selectively raise the first load bed 110 to raised position, as described herein. In various embodiments, the first load bed 110 of the first shuttle unit 100 may be defined by a surface, such as, for example, an at least substantially horizontal surface, upon which an object may be held by the first shuttle unit 100 during a retrieval operation and/or storage operation being executed by the first shuttle unit 100. For example, as illustrated in FIG. 3A, the first load bed 110 may be defined between at least a portion of two opposing lateral load arms 120 of the first shuttle unit 100 (e.g., the first and second lateral load arms 121, 122), as described herein. The first load bed 110 defines a floor configured to support one or more object(s) during movement of the first shuttle unit 100 along a first guide rail 21 to which the first shuttle unit 100 is dynamically engaged (e.g., via the first wheel assembly 140 secured beneath the first shuttle body 101). The first load bed 110 of the first shuttle unit 100 may be defined at least in part by a width extending in a longitudinal direction (e.g., in the z-direction, as illustrated) between the opposing lateral load arms load arms 121, 122, and a depth extending in a lateral direction (e.g., in the x-direction, as illustrated).

Further, as illustrated in FIG. 3B, the first shuttle unit 100 may comprise an opposing set of lateral load arms 120 configured to selectively extend from the shuttle body 101 into a storage location, as described herein. In some embodiments, the first shuttle unit 100 may have first and second lateral load arms 121, 122 defined along opposite side walls of the first shuttle body 101. In various embodiments, one or more of the first set of opposing lateral load arms 120 may have one or more retractable fingers configured to engage an object and move said object onto or off of the first load bed 110.

Further, as illustrated in FIGS. 3A and 3B, the second shuttle unit 200 of the exemplary shuttle assembly 10 may comprise a second shuttle body 201, a second load bed 210, a plurality of retractable load arms comprising a first load arm 221 and a second load arm 222 positioned along opposing longitudinal ends of the second load bed 210, and a second lifting mechanism 230 configured to selectively raise the second load bed 210 to raised position, as described herein. In various embodiments, the second load bed 210 of the second shuttle unit 200 may be defined by a surface, such as, for example, an at least substantially horizontal surface, upon which an object may be held by the second shuttle unit 200 during a retrieval operation and/or storage operation being executed by the second shuttle unit 200. For example, the second load bed 210 may be defined between at least a portion of two opposing lateral load arms 220 of the second shuttle unit 200 (e.g., the first and second lateral load arms 221, 222), as described herein. The second load bed 210 defines a floor configured to support one or more object(s) during movement of the second shuttle unit 200 along a second guide rail 22 to which the first shuttle unit 100 is dynamically engaged (e.g., via the second wheel assembly 240 secured beneath the second shuttle body 201). The second load bed 210 of the second shuttle unit 200 may be defined at least in part by a width extending in a longitudinal direction (e.g., in the z-direction, as illustrated) between the opposing lateral load arms load arms 221, 222, and a depth extending in a lateral direction (e.g., in the x-direction, as illustrated).

Further, the second shuttle unit 100 may comprise an opposing set of lateral load arms 220 configured to selectively extend from the second shuttle body 201 into a storage location, as described herein. In some embodiments, the second shuttle unit 200 may have first and second lateral load arms 221, 222 defined along opposite side walls of the second shuttle body 201. In various embodiments, one or more of the first set of opposing lateral load arms 220 may have one or more retractable fingers configured to engage an object and move said object onto or off of the second load bed 210.

In some embodiments, the shuttle assembly 10 may be dynamically secured relative to one or more guide rails disposed between two storage racks of the materials handling system 1, such that the shuttle assembly 10 may retrieve one or more objects in any storage location defined by one of the two storage racks (e.g., any storage location within a given level at which the shuttle assembly 10 is positioned and/or a storage location defined within a level that is above the given level and within the reach of the vertical extension assembly, as described herein). For example, upon the shuttle assembly 10 being moved along a conveyor path defined by the first and second guide rails 21, 22 to a position in between the two racks, the shuttle assembly 10 may be operable to extend one or more of the retractable load arms in either a first or second outward lateral direction towards one of the two storage racks. For example, two adjacent storage racks may be separated sufficiently to allow the shuttle assembly 10 (e.g., the first shuttle unit 100 and the second shuttle unit 200) to move along one or more guide rails arranged therebetween. Upon retrieval of the object(s), the shuttle assembly 10 is configured to carry said object(s) to another storage location or to a conveyor configured to transport the object to a secondary location defined either within the materials handling system 1 or in an external environment. As illustrated in FIGS. 3C-3E, the shuttle assembly 10 may be configured such that the first shuttle unit 100 is dynamically engaged with the first guide rail 21 via a first wheel assembly 140 provided on a bottom surface of the first shuttle body 101. Further, the second shuttle unit 200 is dynamically engaged with the second guide rail 22 via a second wheel assembly 240 provided on a bottom surface of the second shuttle body 201. As such, the first and second shuttle units 100, 200 are each provided in a position at least substantially above the first and second guide rail 21, 22 engaged therewith, respectively. For example, as illustrated, the first and second guide rails may embody respective monorails arranged in an at least substantially parallel configuration such that when the first and second shuttle units 100, 200 are secured relative to one another (e.g., via an attachment assembly) such that the shuttle assembly 10 defines an assembled configuration, the first shuttle unit 100 may travel along the first guide rail 21 alongside the second shuttle unit 200 moving along the second guide rail 22.

FIGS. 4A and 4B illustrate top perspective views of an exemplary shuttle assembly operable within a materials handling system in accordance with various embodiments described herein. In particular, FIGS. 4A and 4B illustrate an exemplary shuttle assembly 10 configured in an assembled configuration and a split configuration, respectively. For example, the shuttle assembly 10 illustrated in FIG. 4A is shown in the assembled configuration, wherein a first shuttle unit 100 of the shuttle assembly 10 is operatively connected to a second shuttle unit 200 via an attachment assembly (not shown) defined by the shuttle assembly 10. As illustrated, the first load bed 110 defined by the first shuttle unit 100 and the second load bed 210 defined by the second shuttle unit 200 may collectively define a composite load bed of the shuttle assembly 10. As illustrated, the first shuttle unit 100 and the second shuttle unit 200 in the assembled configuration may be arranged in a side-by-side lateral arrangement wherein the first shuttle unit 100 defines a first lateral portion of the shuttle assembly 10 and the second shuttle unit 200 defines an opposing second lateral portion of the shuttle assembly 10. For example, in such an exemplary circumstance, as illustrated, the first load bed 110 and the second load bed 210 may define a first lateral side (e.g., half) and a second lateral side (e.g., half), respectively, of the composite load bed defined by the shuttle assembly 10.

As described herein, an attachment assembly (not shown) of the shuttle assembly 10 may be selectively configured in an engaged position in order to prevent the second shuttle unit 200 from moving relative to the first shuttle unit 100. In such an exemplary configuration, when the shuttle assembly 10 is in the assembled configuration, the second shuttle unit 200 may be positioned at least substantially adjacent the first shuttle unit 100 to which it is operatively connected, such that the first and second shuttle units 100, 200 may move together in unison along respective guide rails (e.g., a first and a second guide rail 21, 22, respectively) throughout a materials handling system in order to execute a handling operation. For example, the first and second shuttle units 100, 200 operatively connected to one another in the assembled configuration may be configured to move together in either a first direction or an opposite second direction defined along the length of the one or more guide rails (e.g., the first and second guide rails 21, 22) to which the shuttle assembly 10 is connected.

The shuttle assembly 10 illustrated in FIG. 4B is shown in the split configuration, wherein the second shuttle unit 200 of the shuttle assembly 10 is detached from the first shuttle unit 100 such that the first and second shuttle units 100, 200 are independently moveable relative to one another along the respective guide rails to which they are each slidably engaged (e.g., the first guide rail 21 and the second guide rail 22). As described herein, an attachment assembly (not shown) of the shuttle assembly 10 may be selectively configured in a disengaged position in order to detach the second shuttle unit 200 from the first shuttle unit 100 such that the second shuttle unit 200 is configured for movement relative to the first shuttle unit 100. For example, the first shuttle unit 100 can move in one or more directions along the first guide rail 21 independently of the second shuttle unit 200, which is configured to move in one or more directions along the second guide rail 22 independently of the first shuttle unit 100. As a non-limiting example, illustrated in FIG. 4B, the first shuttle unit 100 can be selectively operated to move along the length of the first guide rail 21 in a first direction 31 to define a first conveyor path) and the second shuttle unit 200 can move independently of (e.g., relative to) the first shuttle unit 100 along the length of the second guide rail 22 in a second direction 32 to define a second conveyor path. In such an exemplary configuration, the first and second shuttle units 100, 200 may be configured to move independently of and/or relative to one another along respective guide rails defined by the materials handling system such that the first shuttle unit 100 is operable to execute a first handling operation and the second shuttle unit 200 is operable to execute a second handling operation at substantially the same time (e.g., simultaneously).

FIGS. 5A and 5B illustrate top cross-sectional views of an exemplary shuttle assembly according to various embodiments described herein. In particular, FIG. 5A illustrates an exemplary shuttle assembly 10 comprising an attachment assembly comprising one or more actuator arms in an actuated position such that the shuttle assembly 10 defines an attached configuration, and FIG. 5B illustrates the exemplary shuttle assembly 10 with the one or more actuator arms of the attachment assembly in a retracted position such that the shuttle assembly 10 defines a detached and/or split configuration.

In various embodiments, as illustrated in FIG. 5A, the first shuttle unit 100 and the second shuttle unit 200 may be selectively attached relative to one another (e.g., via an attachment assembly 300) such that the shuttle assembly 10 defines an assembled configuration, wherein the first and second shuttle units 100, 200 are configured to move together along a shuttle path defined by the one or more guide rails (e.g., the first guide rail 21, the second guide rail 22) of the materials handling system 1. For example, the exemplary shuttle assembly 10 illustrated in FIGS. 5A and 5B comprises an attachment assembly 300 comprising a first actuator arm 301 and a second actuator arm 302. In various embodiments, the first and second actuator arms 301, 302 of the attachment assembly 300 may embody linear actuators that may be selectively controlled to move along respective (e.g., parallel) axes between a retracted position and an actuated position in order to selectively attach and/or detach the first and second shuttle units 100, 200 relative to one another. For example, in various embodiments, the attachment assembly 300 may be secured relative to the first shuttle unit 100 such that the retracted position and the actuated position are each defined relative to the first shuttle unit 100 (e.g., the first shuttle body 101). As illustrated, the arrangement of the first and second actuator arms 301, 302 being arranged in the actuated position may be defined by the actuator arms 301, 302 being extended at least partially away from the first shuttle unit 100 (e.g., towards the second shuttle units 200 adjacent thereto) in order to physically engage a corresponding portion of the second shuttle unit 200 and at least partially restrict the range of relative motion of the second shuttle unit 200 with respect to the first shuttle unit 100. For example, the first and second actuator arms 301, 302 of the attachment assembly 300 may be configured to protrude from an inward-facing surface 101*a* of the first shuttle body 101 that is at least substantially adjacent to the second shuttle unit 200 and/or faces in a direction towards the second shuttle unit 200 when the shuttle assembly defines an assembled configuration. In various embodiments, the second shuttle unit 200 may be configured to receive the first and second actuator arms 301, 302 provided in the actuated position at a corresponding one or more orifices, apertures, fastener elements, and/or the like, or any other feature configured to engage the respective actuator arm such that the first and second actuator arms 301, 302 may function as a physical obstruction that at least substantially prevents the second shuttle unit 200 from moving relative to the first shuttle unit 100, thereby operatively connecting the first and second shuttle units 100, 200 to one another.

In various embodiments, the attachment assembly of an exemplary shuttle assembly 10 may comprise a first actuator arm secured relative to the first shuttle unit 100 and a second actuator arm secured relative to the second shuttle unit 200. In such an exemplary embodiment, the retracted position and the actuated position of the first actuator arm may be defined relative to the first shuttle body 101 of the first shuttle unit 100, while the retracted position and the actuated position of the second actuator arm may be defined relative to the second shuttle body 201 of the second shuttle unit 200. The attachment assembly may be configured such that the first and second attachment arms anchored to the first and second shuttle units 100, 200, respectively, may be arranged in the respective actuated positions at substantially the same time, such that the first actuator arm extends at least partially away from the first shuttle body 101 (e.g., towards the second shuttle unit 200 adjacent thereto) in order to physically engage a corresponding portion (e.g., orifices, apertures, fastener elements, and/or the like) of the second shuttle unit 200, while the second actuator arm extends at least partially away from the second shuttle body 201 (e.g., towards the first shuttle unit 100 adjacent thereto) in order to physically engage a corresponding portion of the first shuttle unit 100. For example, when the shuttle assembly defines an assembled configuration, the first actuator arm may be configured to protrude from an inward-facing surface 101*a* of the first shuttle body 101 that is at least substantially adjacent to the second shuttle unit 200 and/or faces in a direction towards the second shuttle unit 200, and the second actuator arm may be configured to protrude from an inward-facing surface of the second shuttle body 201 that is at least substantially adjacent to the first shuttle unit 100 and/or faces in a direction towards the first shuttle unit 100.

FIG. 6 illustrates an isolated perspective view of a shuttle unit of an exemplary shuttle assembly according to various embodiments described herein. In various embodiments, one or more of the shuttle units of an exemplary shuttle assembly may comprise at least one position sensor configured to detect the presence of the other shuttle unit in a position at least substantially adjacent thereto to enable the shuttle assembly 10 to detect whether the shuttle units thereof are arranged in the assembly configuration or the split configuration. For example, as illustrated in FIG. 6, the first shuttle unit 100 may comprise one or more proximity sensors 151, 152 provided along a surface of the first shuttle body 101, such as, for example, an inward-facing surface 101*a*, that faces in a direction oriented towards the position where the second shuttle unit (not shown) would be in an instance when the shuttle assembly was arranged in an assembled configuration. Each of the one or more proximity sensors 151, 152 may be oriented to point in a direction away from the first shuttle body 101 such that, upon the second shuttle unit being arranged at least substantially adjacent thereto, the one or more proximity sensors 151 152 detect the presence of the second shuttle body defined by the second shuttle unit and relay a corresponding signal to a system device (e.g., a controller) communicatively connected therewith. In various embodiments, the one or more proximity sensors 151, 152 may be configured to transmit one or more signals configured to facilitate a determination (e.g., by a controller of the shuttle assembly) that an actuator arm of the attachment assembly 300 that is secured to one of the shuttle units (e.g. a first shuttle unit 100) is at least substantially aligned with a corresponding orifice and/or the like defined by the opposing shuttle unit (e.g., a second shuttle unit) of the shuttle assembly. Accordingly, as illustrated in FIG. 6, the proximity sensors 151, 152 defined by the first shuttle unit 100 may be arranged along the same surface of the shuttle body 101 from which the one or more actuators 300 of the attachment assembly are configured to extend. Further, in various embodiments, the shuttle assembly 10 may be configured such that the one or more signals generated by the proximity sensors 151, 152 may function as a trigger that initiates a reconfiguration of the actuation arms of the attachment assembly 300 from a retracted position to an actuated position to secure the shuttle assembly in an assembled configuration (e.g., to secure the first shuttle body 101 and the second shuttle body 201 of the first and second shuttle units 100, 200, respectively, relative to one another).

FIGS. 7A-7C illustrate perspective views of an exemplary shuttle assembly according to various embodiments described herein. In particular, FIGS. 7A-7C illustrate an exemplary shuttle assembly 10 having a first shuttle unit 100 and a second shuttle unit 200 slidably engaged with a first guide rail 21 and a second guide rail 22, respectively, each of which is configured for selective detachment relative to one another. As described herein, the first shuttle unit 100 and the second shuttle unit 200 are independently moveable along the respective guide rails 21, 22 such that the exemplary shuttle assembly 10 may be operable for simultaneous execution of both a first handling operation and a second handling operation by independently controlling the first and second shuttle units 100, 200. In various embodiments, the first shuttle unit 100 and the second shuttle unit 200 of the exemplary shuttle assembly 10 may each comprise a set of opposing lateral load arms configured to extend from a retracted configuration in outward direction away from the shuttle body of the respective shuttle unit to an extended configuration. For example, as illustrated, the first shuttle unit 100 comprises a first set of opposing lateral load arms defined by a first load arm 121 and a second load arm 122, and the second shuttle unit 200 comprises a second set of opposing lateral load arms defined by a first load arm 221 and a second load arm 222.

In various embodiments, upon a shuttle unit (e.g., one of the first shuttle unit 100 and the second shuttle unit 200) of an exemplary shuttle assembly 10 being moved such that the shuttle unit is aligned with a storage location having a storage object disposed therein, the shuttle assembly 10 may be operable to selectively extend the set of opposing lateral load arms of the shuttle unit to the extended configuration (e.g., in an outward direction relative to the shuttle body of the shuttle unit) such that each of the opposing lateral load arms defined by the set are extended towards and/or at least partially into the adjacent storage location. As shown, in various embodiments, each load arm 210, 220 may be extended towards an extended configuration by moving the interconnected arm elements thereof relative to one another along an at least substantially linear guide track configured to cause the load arm to extend in an at least substantially linear (e.g., lateral) direction.

In various embodiments, the first and second sets of opposing lateral load arms 120, 220 defined by the first and second shuttle units 100, 200, respectively, may be independently operable such that each set of load arms may be selectively moved between the retracted and extended configurations independently of the load arms defined by the other shuttle unit. For example, the exemplary shuttle assembly 10 may be configured such that the set of opposing lateral load arms of one of the shuttle units may be independently extended to an extended configuration while the other set of opposing lateral load arms defined by the other shuttle unit remains in a retracted configuration. As illustrated in FIG. 7A, the first set of opposing lateral load arms 120 of the first shuttle unit 100 may be independently extended to an extended configuration while the second set of opposing lateral load arms 220 of the second shuttle unit 200 remain in a retracted configuration. Further, both the first and second sets of opposing lateral load arms 120, 220 of the first and second shuttle units 100, 200, respectively, may be independently operated such that the first and second sets of opposing lateral load arms 120, 220 are arranged in respective extended configurations at substantially the same time. As illustrated in FIG. 7B, the first set of opposing lateral load arms 120 and the second set of opposing lateral load arms 220 may each be extended to a respective extended configuration to facilitate the simultaneous execution of separate storage and/or retrieval operations by the first shuttle unit 100 and second shuttle unit 200. For example, the first set of opposing lateral load arms 120 of the first shuttle unit 100, including the first lateral load arm 121 and the second lateral load arm 122, may be extended in a first outward direction away from the first shuttle body 101 (e.g., in the negative x-direction as defined in the exemplary embodiment illustrated in FIGS. 7A-7C) for interaction with a first storage location adjacent the first shuttle unit 100. Further, the second set of opposing lateral load arms 220 of the second shuttle unit 200, including the first lateral load arm 221 and the second lateral load arm 222, may be extended in an opposite second outward direction away from the second shuttle body 201 (e.g., in the positive x-direction as defined in the exemplary embodiment illustrated in FIGS. 7A-7C) for interaction with a second storage location adjacent the second shuttle unit 200.

Further still, in various embodiments, the shuttle assembly 10 may be configured such that the first set of opposing lateral load arms 120 of the first shuttle unit 100 (e.g., first and second lateral load arms 121, 122) and the second set of load arms 220 of the second shuttle unit 200 (e.g., first and second lateral load arms 221, 222) remain independently operable when the first and second shuttle units 100, 200 are provided in a split configuration, as described herein, wherein the first shuttle body 101 of the first shuttle unit 100 and the second shuttle body 201 of the second shuttle unit 200 are physically detached from one another and/or arranged in a misaligned configuration along the respective guide rails 21, 22 to which the two shuttle units 100, 200 are attached. For example, the first shuttle unit 100 and the second shuttle unit 200 may be detached (e.g., such that the shuttle unit defines a split configuration) for simultaneous execution of respective storage operations with respect to corresponding storage locations defined at different positions along the length of the shuttle aisle. As illustrated in FIG. 7C, the first set of load arms 120 of the first shuttle unit 100 and the second set of load arms 220 of the second shuttle unit 200 may each be independently operated to be selectively extended to an extended configuration upon the respective shuttle unit 100, 200 reaching an aligned position relative to the corresponding storage location. Similarly, the first set of load arms 121, 122 of the first shuttle unit 100 and the second set of load arms 221, 222 of the second shuttle unit 200 may each be independently operated to be selectively retracted to a retracted configuration at the same or different times.

FIGS. 8A-8B illustrate isolated views of a shuttle unit of an exemplary shuttle assembly according to various embodiments described herein. In various embodiments, an exemplary shuttle assembly 10 may comprise one or more shuttle units having a lifting mechanism configured to selectively raise and lower load bed between a nominal position and a raised position. For example, as illustrated in FIGS. 8A-8B, the exemplary shuttle assembly 10 comprises a first shuttle unit 100 having a lifting mechanism 130 operable to selectively raise and lower the first load bed 110 in an at least substantially vertical direction (e.g., in the y-direction as defined in the exemplary embodiment illustrated in FIGS.

8A-8B) between a nominal position and a raised position. As non-limiting examples, the lifting mechanism 130 of an exemplary first shuttle unit 100 may be a hydraulic lift, a pulley system, a gear-drive mechanism, and/or the like, or a combination thereof. For example, in various embodiments, the lifting mechanism 130 may comprise a set of opposing vertical lift arms, each operatively connected to a respective portion of the load bed 110 of the shuttle unit 100 and configured to extend from a nominal position in upward vertical direction away from the shuttle body 101 to a raised position in order to selectively move the load bed 110 in a corresponding vertical direction. For example, as illustrated, the first shuttle unit 100 comprises a first set of opposing vertical lift arms defined by a first lift arm 131 and a second lift arm 132 that are each operatively attached to a respective portion of the load bed 110. In various embodiments, as shown in FIGS. 8A and 8B, the opposing vertical lift arms 131, 132 of the lifting mechanism 130 may be positioned exterior to the load bed 110, such as, for example, along a respective lateral side of the load bed 110. For example, the lifting mechanism 130 may be adjacent to the load bed 110 on the shuttle body 101 in operable communication with the method of movement used (e.g., a motor and/or hydraulics may be in communication with a portion of the load bed 110 to selectively raise and/or lower the load bed 110).

In various embodiments, the first and second vertical lift arms 131, 132 of the first lifting mechanism 130 of the first shuttle unit 100 may each be defined by a series of lift arms having an independently retractable configuration and being arranged in a telescoping and/or adjacent arrangement along a lateral side of the load bed 110. As a non-limiting example illustrated in FIGS. 8A-8B, the first lift arm 131 of the lift mechanism 130 may be defined by a plurality of retractable lift elements including a first lift element 131*a*, a second lift element 131*b*, a third lift element 131*c*, and a fourth lift element 131*d*, wherein the fourth lift element 131*d* is secured relative to at least a portion of the load bed 110 such that a movement of the fourth lift element 131*d* (e.g., a motor-drive retraction of the first load arm 131) may cause at least a portion of the load bed 110 connected thereto to exhibit a corresponding movement. Further, as illustrated, in various embodiments, the second lift arm 132 of the lift mechanism 130 may be defined by a second independently operable plurality of retractable lift elements including a first lift element 132*a*, a second lift element 132*b*, a third lift element 132*c*, and a fourth lift element 132*d*, wherein the fourth lift element 132*d* is secured relative to at least a portion of the load bed 110 such that a movement of the fourth lift element 132*d* (e.g., a motor-drive retraction of the first load arm 131) may cause at least a portion of the load bed 110 connected thereto to exhibit a corresponding movement.

The first and second lift arms 131, 132 may be selectively configured between the nominal and raised positions to control the movement of the load bed 110 in one or more vertical directions (e.g., in the y-direction as defined by the exemplary orientation illustrated in FIGS. 8A-8B) through a vertical range of motion. For example, the vertical range of motion of the load bed defined by the lifting mechanism 130 operatively attached thereto (e.g., the first and second vertical lift arms 131, 132) may be defined along an at least substantially vertical axis that is oriented in a direction that is at least substantially perpendicular to the direction in which the set of lateral load arms 121, 122 are moved between the retracted and extended configurations. In various embodiments, the first shuttle unit 100 of an exemplary shuttle assembly 10 may be configured such that the movement of the set of opposing load arms 120 between the retracted and extended configurations is defined within an at least substantially horizontal plane (e.g., within the x-z plane as defined by the orientation illustrated in the exemplary embodiment shown in FIG. 8A) and the movement of the load bed 110 cause by the set of opposing vertical lift arms 131, 132 being rearranged between the nominal and raised position is defined within an at least substantially vertical plane (e.g., within the x-y plane as defined by the orientation illustrated in the exemplary embodiment shown in FIG. 8A).

FIGS. 9A-9C illustrate perspective views of an exemplary shuttle assembly according to various embodiments described herein. In particular, FIGS. 9A-9C illustrate an exemplary shuttle assembly 10 having a first shuttle unit 100 and a second shuttle unit 200 slidably engaged with a first guide rail 21 and a second guide rail 22, respectively, each of which is configured for selective detachment relative to one another. As described herein, the first shuttle unit 100 and the second shuttle unit 200 are independently moveable along the respective guide rails 21, 22 such that the exemplary shuttle assembly 10 may be operable for simultaneous execution of both a first handling operation and a second handling operation by independently controlling the first and second shuttle units 100, 200. In various embodiments, the first shuttle unit 100 and the second shuttle unit 200 of the exemplary shuttle assembly 10 may each comprise a lifting mechanism defined by a set of opposing retractable vertical lift arms configured to extend from a retracted configuration in an upward vertical direction away from the shuttle body of the respective shuttle unit to an extended configuration in order to move the load bed of the respective shuttle unit in a corresponding upward direction from a nominal position to a raised position. For example, as illustrated, the first shuttle unit 100 comprises a first lifting mechanism 130 having a set of opposing vertical lift arms defined by a first lift arm 131 and a second lift arm 132, and the second shuttle unit 200 comprises a second set of opposing vertical lift arms defined by a first lift arm 231 and a second lift arm 232.

In various embodiments, upon a shuttle unit (e.g., one of the first shuttle unit 100 and the second shuttle unit 200) of an exemplary shuttle assembly 10 being moved such that the shuttle unit is aligned with a storage location having a storage object disposed therein, the shuttle assembly 10 may be operable to selectively raise the load bed from the nominal position to the raised position by extending the set of opposing vertical lift arms of the shuttle unit to the extended configuration (e.g., in an upward direction relative to the shuttle body of the shuttle unit). For example, in such an exemplary configuration, the opposing vertical lift arms defining the lift mechanism of a shuttle unit positioned along a first level of the materials handling system are extended upwards such that the load bed of the shuttle unit is positioned at least substantially level and/or aligned with the adjacent storage location of a second level above the first level. As shown, in various embodiments, each lift arm of the first and second lift mechanisms 130, 230 may each be extended towards an extended configuration by moving the interconnected arm elements thereof relative to one another to cause the lift arm to extend in an at least substantially linear vertical direction (e.g., along parallel vertical axes in the y direction as defined in the exemplary orientation illustrated in FIGS. 9A-9C).

In various embodiments, the first and second lifting mechanisms 130, 230 defined by the first and second shuttle units 100, 200, respectively, may be independently operable such that each set of vertical lift arms may be selectively moved between the retracted and extended configurations to move the respective load beds 110, 210 independently of the load beds defined by the other shuttle unit. For example, the exemplary shuttle assembly 10 may be configured such that the set of opposing vertical lift arms of one of the shuttle units may be independently extended to an extended configuration while the other set of opposing vertical lift arms defined by the other shuttle unit remains in a retracted configuration. As illustrated in FIG. 7A, the first lifting mechanism 130 (e.g., the first and second vertical lift arms 131, 132) of the first shuttle unit 100 may be independently extended to an extended configuration while the second the second lifting mechanism 230 (e.g., the first and second vertical lift arms 231, 232) of the second shuttle unit 200 remains in a retracted configuration. Further, both the first and second lifting mechanisms 130, 230 of the first and second shuttle units 100, 200, respectively, may be independently operated such that the first set of opposing vertical lift arms 131, 132 and the second set of opposing vertical lift arms 231, 232 are each arranged in respective extended configurations at substantially the same time. As illustrated in FIG. 7B, the first lifting mechanism 130 and the second lifting mechanism 230 may each be extended to a respective extended configuration to facilitate the simultaneous arrangement of the first and second load beds 110, 220 in respective raised positions in order to enable a simultaneous execution of separate storage and/or retrieval operations by the first shuttle unit 100 and second shuttle unit 200. For example, the first lifting mechanism 130 of the first shuttle unit 100, including the first vertical lift arm 131 and the second vertical lift arm 132, may be extended in a first upward vertical direction away from the first shuttle body 101 (e.g., in the positive y-direction as defined in the exemplary embodiment illustrated in FIGS. 9A-9C) in order to align the first load bed 110 with a storage location provided in a level of a materials handling system that is disposed above the first shuttle body 101. In such an exemplary circumstance, the first lifting mechanism 130 of the first shuttle unit 100 may be arranged in the extended configuration to facilitate execution of a storage and/or retrieval operation with respect to a storage location in the level above the first shuttle body 101 of the first shuttle unit 100. Further, the second lifting mechanism 230 of the second shuttle unit 200, including the first vertical lift arm 231 and the second vertical lift arm 232, may be extended in a second upward vertical direction away from the second shuttle body 201 (e.g., in the positive y-direction as defined in the exemplary embodiment illustrated in FIGS. 9A-9C) in order to align the second load bed 210 with a storage location provided in a level of a materials handling system that is disposed above the second shuttle body 201. In such an exemplary circumstance, the second lifting mechanism 230 of the second shuttle unit 200 may be arranged in the extended configuration to facilitate execution of a storage and/or retrieval operation with respect to a storage location in the level above the second shuttle body 201 of the second shuttle unit 200.

Further still, in various embodiments, the shuttle assembly 10 may be configured such that the first lifting mechanism 130 of the first shuttle unit 100 (e.g., first and second vertical lift arms 131, 132) and the second lifting mechanism 230 of the second shuttle unit 200 (e.g., first and second vertical lift arms 231, 232) remain independently operable when the first and second shuttle units 100, 200 are provided in a split configuration, as described herein, wherein the first shuttle body 101 of the first shuttle unit 100 and the second shuttle body 201 of the second shuttle unit 200 are physically detached from one another and/or arranged in a misaligned configuration along the respective guide rails 21, 22 to which the two shuttle units 100, 200 are attached. For example, the first shuttle unit 100 and the second shuttle unit 200 may be detached (e.g., such that the shuttle assembly defines a split configuration) for simultaneous execution of respective storage operations with respect to corresponding storage locations defined at different positions along the length of the shuttle aisle. As illustrated in FIG. 9C, the first lifting mechanism 130 of the first shuttle unit 100 and the second lifting mechanism 230 of the second shuttle unit 200 may each be independently operated to selectively raise the load beds 110, 210 to respective raised positions upon the shuttle units 100, 200 reaching an aligned position relative to the corresponding storage location. Similarly, the first lifting mechanism 130 (e.g., the first set of opposing vertical lift arms 131, 132) of the first shuttle unit 100 and the second lifting mechanism 230 (e.g., the second set of opposing vertical lift arms 231, 232) of the second shuttle unit 200 may each be independently operated to selectively lower the load beds 110, 210 from raised positions to respective nominal positions upon the shuttle units 100, 200 retrieving an object from the corresponding storage locations by lowering the first and second lifting mechanisms 130, 230 from extended configurations to corresponding retracted configurations.

In various embodiments, an exemplary shuttle assembly 10 provided in the assembled configuration may be defined at least in part by the first shuttle unit 100 being positioned at least substantially adjacent the second shuttle unit 200 such that the first load bed 110 of the first shuttle unit 100 and the second load bed 210 of the second shuttle unit 200 collectively define a composite load bed. For example, in such am exemplary configuration, as illustrated in FIGS. 10A-10C, the composite load bed may be defined by an arrangement of the first load bed 110 and the second load bed 210 in an at least substantially coplanar arrangement. FIGS. 10A-10C illustrate schematic top views of an exemplary shuttle assembly 10 configured for rearranging the position of an object 2 disposed on a composite load bed by selectively moving the object 2 between the first load bed 110 and the second load bed 210 in accordance with various embodiments described herein. As illustrated, wherein the composite load bed of an exemplary shuttle assembly 10 in the assembled configuration may be defined by an arrangement of the first load bed 110 and the second load bed 210 in a side-by-side arrangement wherein a first bed depth defined by the first load bed 110 and a second bed depth defined by the second load bed 210 collectively define a composite depth defined in the lateral direction (e.g., in the z-direction as defined in the orientation illustrated in FIGS. 10A-10C).

In various embodiments, as illustrated in FIG. 10A, the shuttle assembly 10 executing a storage operation may be defined at least in part by an object 2 being received at the first load bed 110 of the first shuttle unit 100. In various embodiments, the shuttle assembly 10 may comprise one or more moving mechanisms configured to engage the object 2 to enable and/or facilitate the movement of the object from one shuttle unit (e.g., the first shuttle unit 100) to the other (e.g., the second shuttle unit 200). For example, as illustrated, the first shuttle unit 100 may comprise a first moving mechanism 160 defined by one or more hinged load arms configured to engage the object 2 disposed on the first load bed 110 and, upon securing the object 2 therebetween and/or otherwise relative thereto, may rotate about an at least substantially longitudinal first hinge axis 161 in order to move the object 2 at least partially towards (e.g., above) the second load bed 210 of the second shuttle unit 200. Upon the one or more hinged load arms engaged with the object 2 having rotated such that the object 2 is disposed above the second load bed 210, the one or more hinged load arms may be configured to selectively disengage the object 2 so as to drop the object 2 in a position atop the second load bed 210. For example, the one or more hinged load arms of the first moving mechanism 160 may be configured to selectively return to an initial position, as illustrated in FIG. 10C, such that, upon a second object (not shown) being retrieved by the first shuttle unit 100 and disposed in an initial position on the first load bed 110, the first moving mechanism 160 may be configured to execute a second moving operation to selectively rearrange the second object to a position atop the second load bed 210 of the second shuttle unit 200.

Similarly, in various embodiments, the shuttle assembly 10 executing a storage operation may be defined at least in part by an object 2 being received at the second load bed 210 of the second shuttle unit 200. In various embodiments, the second shuttle unit 200 of the shuttle assembly 10 may comprise a second moving mechanism 260 configured to engage the object 2 to enable and/or facilitate the movement of the object from the second shuttle unit 200 to the first shuttle unit 100. For example, the second shuttle unit 200 may comprise a second moving mechanism 260 defined by one or more hinged load arms configured to engage the object 2 disposed on the second load bed 210 and, upon securing the object 2 therebetween and/or otherwise relative thereto, may rotate about an at least substantially longitudinal second hinge axis 261 in order to move the object 2 at least partially towards (e.g., above) the first load bed 110 of the first shuttle unit 100. Upon the one or more hinged load arms engaged with the object 2 having rotated such that the object 2 is disposed above the first load bed 110, the one or more hinged load arms may be configured to selectively disengage the object 2 so as to drop the object 2 in a position atop the first load bed 110. For example, the one or more hinged load arms of the second moving mechanism 260 may be configured to selectively return to an initial position such that, upon a second object (not shown) being subsequently retrieved by the second shuttle unit 200 and disposed in an initial position on the second load bed 210, the second moving mechanism 260 may be configured to execute a second moving operation to selectively rearrange the second object to a position atop the first load bed 110 of the first shuttle unit 100.

In various embodiments, the moving mechanism 160 of the shuttle assembly 10 may be operable during the execution of a storage and/or retrieval operation to increase shuttle assembly capacity, such as, for example, with respect to a plurality of objects stored in a double deep storage location, in order to decrease cycle time and increase throughput associated with the storage and/or retrieval operation. As a non-limiting example provided for illustrative purposes, an exemplary shuttle assembly 10 in the assembled configuration may execute a retrieval operation with respect to a first object and a second object stored in double-deep storage location by moving along the guide rail(s) to a position in which the first shuttle unit 100 is at least substantially adjacent and/or aligned with the double-deep storage location. The first shuttle unit 100 may retrieve the first object positioned nearest the shuttle assembly 10 (e.g., using an opposing set of lateral load arms) from within the double-deep storage location such that the first object is disposed on the first load bed 110 of the first shuttle unit 100. In various embodiments, prior to the shuttle assembly 10 retrieving the second object positioned deeper within the double-deep storage location, the moving mechanism 160 of the shuttle assembly 10 may be selectively operated, as described herein, in order to reposition the first object from the first load bed 110 of the first shuttle unit 100 to the second load bed 210 of the second shuttle unit 200. For example, the moving mechanism 160 may be configured to reposition the first object to the load bed of the shuttle unit furthest away from the storage location (e.g., the second shuttle unit 200 in the non-limiting, illustrative example described above) in order to make room on the first load bed 110 for the second object to be disposed upon the subsequent retrieval thereof from second object within the double-deep storage location. Upon the first object being repositioned from the first load bed 110 to the second load bed 210 by the moving mechanism 160, the shuttle assembly 160 may be selectively reconfigured to the split configuration to enable the second shuttle unit 200 to proceed with transporting the first object to a particular secondary location within the AS/RS independently of the first shuttle unit 100. For example, the second shuttle unit 200 may transport the first object to the secondary location while the first shuttle unit 100 is executing the retrieval of the second object from within the double-deep storage location.

FIGS. 11A and 11B illustrate various views of a wheel assembly configured for securing a shuttle unit of an exemplary shuttle assembly in a slidable engagement relative to a guide rail such that the shuttle unit is moveable along the length of the guide rail. In particular, FIG. 11A and FIG. 11B illustrate a perspective view and a front view of an exemplary wheel assembly 140 of a first shuttle unit. As illustrated in FIGS. 11A-11B, an exemplary wheel assembly 140 may comprise a wheel frame element 141, one or more drive wheels 142, one or more guide wheels 143, one or more balancing wheels 144, and one or more electrically conductive bus bar engagement components 145. As illustrated, an exemplary wheel assembly 140 may comprise a frame element 141 configured to secure the position of each of the wheels relative to a surface of a guide rail 21 to facilitate the dynamic engagement of the wheel assembly 140 (e.g., and thus, the shuttle unit secured thereto) along the guide rail 21. For example, the wheel assembly 140 may be configured to rotatably secure each of the drive wheels 142, guide wheels 143, and/or balancing wheels 144 relative thereto such that each wheel of the wheel assembly 140 is configured for independent rotation about a respective wheel axis based in least in part on a physical engagement of the respective wheel with a corresponding portion of a guide rail 21 surface. In various embodiments, the frame element 141 of the wheel assembly 140 may be configured for arrangement at a surface of the shuttle body (e.g., at a bottom surface) of the shuttle unit of an exemplary shuttle assembly in order to facilitate the dynamic engagement of an exemplary shuttle unit in a position atop a guide rail 21. For example, the dynamic configuration of a shuttle unit may be defined by the wheel assembly 140 secured to the bottom of the shuttle body of the shuttle unit. For example, in various embodiments, the wheel assembly 140 may be configured such that the shuttle unit is moveable (e.g., slidable) in one or more directions along the length of an exemplary guide rail 21 (e.g., in the z-direction as defined by the orientation of the exemplary embodiment illustrated in FIGS. 11A and 11B) while preventing the shuttle unit from movement in either a lateral direction and/or a vertical direction perpendicular to the length of the guide rail 21 (e.g., in either an x-direction or a y-direction, respectively, as defined by the orientation of the exemplary embodiment illustrated in FIGS. 11A and 11B). In various embodiments, the wheel assembly 140 may be configured to facilitate independent movement of an exemplary shuttle unit along a single rail (e.g., monorail) guide track system.

As illustrated, the wheel assembly 140 may comprise one or more drive wheels 142 secured relative to an upper portion of the frame assembly 141 such that each drive wheel 142 is rotatable about a central axis oriented in an at least substantially lateral direction (e.g., in the x-direction as defined by the orientation of the exemplary embodiment illustrated in FIGS. 11A and 11B). The one or more drive wheels 142 are each configured to facilitate the dynamic configuration of the wheel assembly 140 relative to the guide rail 21 by at least substantially reducing the surface friction generated by the movement of the wheel assembly 140 relative to a top surface of the guide rail 21. For example, each of the drive wheels 142 may be configured to physically contact an upward-facing surface of the guide rail 21, such as, for example, an at least substantially horizontal top surface of the guide rail 21, such that that one or more drive wheels 142 are collectively configured to impart an at least substantially downward vertical force on the guide rail 21. The one or more drive wheels 142 may comprise a plurality of drive wheels including a first set of drive wheels 142A and a second set of drive wheels 142B provided at a front end and a rear end of the frame element 141, respectively.

In various embodiments, one or more of the drive wheels 142 may be electronically connected to a power source and/or communicatively connected to one or more components of a materials handling system (e.g., a controller) such that the drive wheel 142 may be selectively operable to drive a rotation thereof about a respective central axis. In such an exemplary configuration, one or more of the drive wheels 142 may be controlled using one or more control signals generated from a controller communicatively connected therewith to drive the rotation of the drive wheel 142 to cause the drive wheel 142 to move along the length of the guide rail 21. Each of the drive wheels 142 may be secured relative to the frame element 141 such that the movement of the drive wheel 142 along the guide rail 21 may cause the frame element 141 (e.g., and the shuttle unit operatively secured thereto) to slide along the guide rail 21.

As illustrated, in various embodiments, the wheel assembly 140 may comprise one or more guide wheels 143 secured relative to one or more lateral sides of the frame assembly 141 such that each guide wheel 143 is configured to physically contact a lateral side of guide rail 21. For example, each of the one or more guide wheels 143 may be rotatable about a respective central axis oriented in an at least substantially vertical direction (e.g., in the y-direction as defined by the orientation of the exemplary embodiment illustrated in FIGS. 11A and 11B). The one or more guide wheels 143 are each configured to facilitate the dynamic configuration of the wheel assembly 140 relative to the guide rail 21 by at least substantially reducing the surface friction generated by the movement of the wheel assembly 140 relative to a lateral side surface of the guide rail 21. For example, each of the guide wheels 143 may be configured to physically contact a laterally-outward-facing surface of the guide rail 21, such as, for example, an at least substantially vertical side surface of the guide rail 21 (e.g., a surface oriented to face in an x-direction as defined by the orientation illustrated in the exemplary embodiment of FIGS. 11A and 11B). The one or more guide wheels 143 may comprise a plurality of drive wheels including a first set of guide wheels 143A and a second set of guide wheels 143B provided along a first lateral side and a second lateral side of the frame element 141, respectively. For example, a wheel assembly 140 having a first and a second set of guide wheels 143A, 143B on respective lateral sides of the frame element 141 to engage opposing lateral side surfaces of the guide rail 21 in order to at least substantially restrict the wheel assembly 140 from moving in a lateral direction relative to the guide rail 21.

In various embodiments, the wheel assembly 140 may comprise one or more balancing wheels 144 secured relative to a bottom portion of the frame assembly 141 such that each balancing wheel 144 is rotatable about a respective central axis oriented in an at least substantially lateral direction (e.g., in the x-direction as defined by the orientation of the exemplary embodiment illustrated in FIGS. 11A and 11B). The one or more balancing wheels 144 are each configured to facilitate the dynamic configuration of the wheel assembly 140 relative to the guide rail 21 by at least substantially reducing the surface friction generated by the movement of the wheel assembly 140 relative to a bottom surface of the guide rail 21. For example, each of the balancing wheels 144 may be configured to physically contact a downward-facing surface of the guide rail 21, such as, for example, an at least substantially horizontal bottom surface of the guide rail 21, such that that one or more balancing wheels 144 are collectively configured to impart an at least substantially upward vertical force on the guide rail 21 that opposes the downward force imparted on the guide rail 21 from the one or more drive wheels 142. As illustrated, the one or more balancing wheels 144 may comprise a plurality of balancing wheels including a first set of balancing wheels 144A and a second set of balancing wheels 144B provided on respective lateral sides of the frame element 141 to engage opposing lateral sides of the bottom surface of the guide rail 21.

In various embodiments, the wheel assembly 140 may further comprise one or more electrically conductive bus bar engagement component 145 secured relative to the frame element 141 and configured to physically engage a bus bar defined by the guide rail 21 to which the shuttle unit is engaged such that the shuttle unit may remain in electronic communication with the bus bar as the shuttle unit moves along the guide rail 21 via a physical contact of the one or more electrically conductive bus bar engagement component 145 with the bus bar. For example, the electrically conductive bus bar engagement component 145 of the wheel assembly 140 may enable the shuttle unit to receive a constant power supply (e.g., 48 VDC) from at least one bus bar located along a respective side surface of the guide rail 21 to which the shuttle unit (e.g., the wheel assembly 140) is operatively secured. In various embodiments, the powered guide rail 21 (e.g., 48 VDC power supplied to the track) may be powered from a DC power panel and configured to transmit one or more power and/or control signals various electronic components of the shuttle unit engaged therewith via the electronic connection defined between the bus bar of the guide rail and the one or more electrically conductive bus bar engagement component 145 in physical contact therewith. As a non-limiting example illustrated in the exemplary embodiment shown in FIGS. 11A and 11B, wherein an exemplary guide rail 21 defines a first bus bar along a first side surface thereof and a second guide bar arranged along an opposing second side surface thereof, the wheel assembly 140 may comprise a first electrically conductive bus bar engagement component 145A and a second electrically conductive bus bar engagement component 145B configured to physically contact the first and second bus bars of the guide rail 21, respectively.

In various embodiments, the wheel assembly 140 of an exemplary shuttle unit may be configured to engage a guide rail 21 such that the shuttle unit may move independently along at least a portion of the guide rail 21 that defines a single rail (e.g., monorail) guide track system. For example, as illustrated in FIG. 12, the wheel assembly 140 may be configured to dynamically engage the guide rail 21 such that each shuttle unit of a shuttle assembly 10 may move through the along the monorail track system through a portion of the guide rail 21 length that defines an L-shaped curve 23. As a non-limiting example, both a material handling system 1 may include a first shuttle assembly 10a and a second shuttle assembly 10b each defined by independently moveable shuttle units dynamically engaged with a respective one of the first and second guide rails 21, 22. As illustrated, the first and second guide rails 21, 22 may each embody a monorail guide track such that, collectively, the first and second guide rails 21, 22 defined a set of at least substantially parallel guide rails defining respective monorail configurations in order to facilitate the movement of each of the first and second shuttle assemblies 10a, 10b through a curved guide track portion 23 of the materials handling system 1.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shuttle assembly configured for use in an automated storage and retrieval system, the shuttle assembly comprising:

a first shuttle unit comprising a first load bed having a first width defined between a first set of opposing lateral load arms; and a second shuttle unit comprising a second load bed comprising a second width defined between a second set of opposing lateral load arms;

wherein the shuttle assembly is operable in an assembled configuration defined at least in part by the first shuttle unit and the second shuttle unit being operatively connected to one another such that the first shuttle unit and the second shuttle unit are configured to move together along a shuttle path defined by one or more guide rails of the automated storage and retrieval system; and wherein the shuttle assembly is selectively configurable between the assembled configuration and a split configuration, the split configuration being defined at least in part by the first shuttle unit and the second shuttle unit being detached from one another such that the first shuttle unit is moveable independent of the second shuttle unit along a first shuttle path defined by a first guide rail and the second shuttle unit is moveable independent of the first shuttle unit along a second shuttle path defined by a second guide rail.

2. The shuttle assembly of claim 1, further comprising a moving mechanism configured to interact with an object disposed on the shuttle assembly to facilitate a selective repositioning of the object between the first load bed of the first shuttle unit and the second load bed of the second shuttle unit.

3. The shuttle assembly of claim 2, wherein the moving mechanism comprises a first set of hinged load arms rotatably secured to at least a portion of the first shuttle unit and a second set of hinged load arms rotatably secured to at least a portion of the second shuttle unit, wherein each of the first set of hinged arms and the second set of hinged arms defined by the moving mechanism is operable to execute one of a first repositioning of the object from the first load bed to the second load bed and a second repositioning of the object from the second load bed to the first load bed.

4. The shuttle assembly of claim 1, wherein the shuttle assembly is configured such that in the split configuration, the first shuttle unit is operable to execute a first material handling operation with respect to a first object and the second shuttle unit is operable to execute a second material handling operation with respect to a second object.

5. The shuttle assembly of claim 4, wherein the first material handling operation and the second material handling operation define at least substantially simultaneous operations.

6. The shuttle assembly of claim 1, wherein the first shuttle unit comprises a first lifting mechanism operable to move a between a first retracted configuration and a first extended configuration in order to cause the first load bed to move through a first vertical range of motion defined between a first nominal position and a first raised position; and wherein the second shuttle unit comprises a second lifting mechanism operable to move a between a second retracted configuration and a second extended configuration in order to cause the second load bed to move through a second vertical range of motion defined between a second nominal position and a second raised position.

7. The shuttle assembly of claim 6, wherein the first vertical range of motion is defined relative to a first shuttle body of the first shuttle unit, and wherein the second vertical range of motion is defined relative to a second shuttle body of the second shuttle unit.

8. The shuttle assembly of claim 1, wherein the first load bed of the first shuttle unit is defined at least in part by a first width defined in a lateral direction between a first set of opposing lateral load arms; and wherein the second load bed of the second shuttle unit is defined at least in part by a second width defined in the lateral direction between a second set of opposing lateral load arms.

9. The shuttle assembly of claim 8, wherein the assembled configuration of the shuttle assembly is defined at least in part by the first shuttle unit being positioned at least substantially adjacent the second shuttle unit such that the first load bed of the first shuttle unit and the second load bed of the second shuttle unit collectively define a composite load bed.

10. The shuttle assembly of claim 9, wherein the composite load bed is defined by an arrangement of the first load bed and the second load bed in an at least substantially coplanar arrangement.

11. The shuttle assembly of claim 9, wherein the composite load bed is defined by an arrangement of the first load bed and the second load bed in a side-by-side arrangement wherein a first bed length defined by the first load bed and a second bed length defined by the second load bed collectively define a composite length arranged in the longitudinal direction perpendicular to the first width of the first shuttle unit and the second width of the second shuttle unit.

12. The shuttle assembly of claim 1, further comprising an attachment assembly configurable in an engaged configuration to facilitate the selective connection of the first shuttle unit to the second shuttle unit to secure the shuttle assembly in the assembled configuration.

13. The shuttle assembly of claim 12, wherein the attachment assembly comprises one or more actuator arms configurable between a retracted configuration and an extended configuration, the attachment assembly being configured such that the extended configuration is defined by the one or more actuator arms extending from the first shuttle unit to physically engage at least a portion of the second shuttle unit.

14. The shuttle assembly of claim 12, wherein the attachment assembly is configurable in a disengaged configuration to facilitate a selective detachment of the second shuttle unit from the first shuttle unit to enable an independent movement of the second shuttle unit relative to the first shuttle unit.

15. The shuttle assembly of claim 14, further comprising a position sensor, wherein the shuttle assembly is configured to selectively configure the attachment assembly between the disengaged configuration and the engaged configuration based at least in part on data captured by the position sensor.

16. The shuttle assembly of claim 15, wherein the position sensor is defined by a proximity sensor provided at the first shuttle body of the first shuttle unit such that the proximity sensor is configured to detect an instance wherein the second shuttle unit is in an at least substantially adjacent position relative thereto.

17. The shuttle assembly of claim 1, wherein the first shuttle unit is dynamically engaged with a first guide rail and configured to define a first range of motion along a first length of the first guide rail, wherein the second shuttle unit is dynamically engaged with a second guide rail and configured to define a second range of motion along a second length of the second guide rail, and wherein the first guide rail and the second guide rail are arranged in an at least substantially parallel configuration relative to one another.

18. The shuttle assembly of claim 1, wherein the first shuttle unit comprises a first wheel assembly that is dynamically engaged with a rail assembly of the AS/RS to facilitate movement of the first shuttle unit along a length of the rail assembly, and wherein the second shuttle unit comprises a second wheel assembly that is dynamically engaged with the rail assembly of the AS/RS to facilitate movement of the second shuttle unit along the length of the rail assembly.

19. The shuttle assembly of claim 18, wherein the first wheel assembly is configured to dynamically engage the first guide rail such that the first shuttle unit is configured for movement through an at least partially curved portion defined by the first guide rail.

20. An automated storage and retrieval system comprising the shuttle assembly of claim 1.

* * * * *